United States Patent [19]
Saito et al.
[11] 3,789,147
[45] Jan. 29, 1974

[54] TELEPHONE EXCHANGE EQUIPMENT CONDITION CHANGE DETECTING APPARATUS

[75] Inventors: Yoshihiro Saito, Yokohama; Tomoo Okada, Kawasaki; Eiichi Odera, Kunitachi; Teruyuki Matsuzawa, Kawasaki, all of Japan

[73] Assignee: Fujitsu Limited, Kawasaki, Japan

[22] Filed: Mar. 8, 1972

[21] Appl. No.: 232,924

Related U.S. Application Data

[63] Continuation-in-part of Ser. No. 888,277, Dec. 29, 1969, abandoned.

[30] Foreign Application Priority Data

Dec. 28, 1968 Japan .................................. 43-187

[52] U.S. Cl. ............................................ 179/18 FA
[51] Int. Cl. ............................................ H04q 3/24
[58] Field of Search ........... 179/18 F, 18 FA, 18 EB

[56] References Cited

UNITED STATES PATENTS

| | | | |
|---|---|---|---|
| 3,183,498 | 5/1965 | Midis et al. | 179/18 F X |
| 3,390,235 | 6/1968 | Diggelmann et al. | 179/18 FA |
| 3,431,365 | 3/1969 | Siegel et al. | 179/18 EB |

*Primary Examiner*—William C. Cooper
*Attorney, Agent, or Firm*—Arthur E. Wilfond et al.

[57] ABSTRACT

Condition change detecting apparatus detects the change of condition of an operation peripheral device by a variation in direct current flowing through a line. The change detecting apparatus has a condition detecting element and an impedance element equivalent to the value of impedance difference caused by the operation of the peripheral device. The condition detecting element comprises a magnetic core, a control winding on the core for detecting the line current, a compensating winding on the core for producing a magnetic field in a direction which negates the magnetic field produced by the control winding, a drive winding on the core and a sense winding on the core. The impedance element is connected in the line and the magnitude of current supplied to the compensating winding is determined by scanning means. The impedance element is then disconnected from the line.

11 Claims, 26 Drawing Figures

TELEPHONE EXCHANGE EQUIPMENT CONDITION CHANGE DETECTING APPARATUS

DESCRIPTION OF THE INVENTION

The present application is a Continuation-in-Part application of application Ser. No. 888,277, filed Dec. 29, 1969 for "Telephone Exchange Equipment Condition Change Detecting Apparatus", and assigned to the same assignees, now abandoned.

The invention relates to condition change detecting apparatus. More particularly, the invention relates to condition change detecting apparatus in telephone exchange equipment.

The invention relates to a system for utilizing a multifrequency signal receiver in telephone exchange equipment. There are many types of multifrequency signal receivers utilized in telephone exchange equipment, utilized for their respective purposes. A pushbutton, multifrequency or Touch Tone receiver is utilized in a multifrequency or Touch Tone originating register to receive multifrequency signals from a pushbutton, multifrequency or Touch Tone telephone and is an example of a multifrequency signal receiver. A multifrequency receiver is ordinarily housed in a multifrequency originating register. Since the register is maintained or held during the time that the subscriber dials all the necessary digits, the holding time of the multifrequency receiver is also dominated by what is called the subscriber's habit, and ineffective holding frequently results.

On the other hand, there is a method in which a multifrequency receiver is not exclusively connected to a multifrequency originating register, but such a receiver is connected into the circuit by such a register through a connector only when it is necessary. In such method the multifrequency originating register includes a detector for determining whether a subscriber has touched a button of a pushbutton telephone. Simultaneously with the subscriber's touching the button of the telephone, a connector is initiated in connection and an idle multifrequency receiver is connected into the circuit. Multifrequency signals from the subscriber are then received by the multifrequency receiver and said signals are converted into DC signals and are transferred to the multifrequency originating register. Upon the termination of the transfer, the multifrequency originating register releases the connector from connection and disconnects the multifrequency receiver. The holding time of the multifrequency receiver may therefore be very short, and it is only necessary to provide a small number of multifrequency receivers compared with the number of multifrequency originating registers. In such method, however, it is necessary to determine the subscriber's touching of the button of his telephone immediately in order to initiate the connection of the connector and to connect into the circuit the multifrequency receiver. If this is not accomplished immediately, there is a great possibility that there will be an incompleted call or a misconnected call when the subscriber touches the button of his telephone only briefly.

The principal object of the invention is to provide new and improved telephone exchange equipment condition change detecting apparatus.

An object of the invention is to provide a new and improved system for connecting into circuit a small number of multifrequency receivers to a large number of multifrequency originating registers, in which system the subscriber's touching of the button of a pushbutton telephone is immediately detectable.

An object of the invention is to provide a system including an arbitrary circuit connecting arrangement for a multifrequency originating register, for replacing an arbitarily connected arrangement for a multifrequency receiver and for replacing an arbitrary peripheral device for a pushbutton or multifrequency telephone.

An object of the invention is to provide new and improved apparatus for determining whether a subscriber has touched a button of a pushbutton telephone by utilizing the variation of the line current or DC key signal.

An object of the invention is to rapidly determine a slight variation of line current with efficiency, effectiveness and reliability.

An object of the invention is to provide a system wherein the detecting area is automatically set in correspondence with the magnitude of the line resistance.

In accordance with the present invention, apparatus for detecting a change in condition in equipment comprises a magnetic core. A control winding is wound on the core and connected in a line of a circuit having a current which varies in accordance with a change of condition of the equipment for detecting the line current and producing a magnetic field in accordance with the line current. A compensating winding is wound on the core for producing a magnetic field having a direction which negates the magnetic field produced by the control winding. A drive winding is wound on the core. Drive means connected to the drive winding supplies drive current to the drive winding to produce a magnetic field in the drive winding. A sense winding is wound on the core for sensing the magnetic condition of the core. An impedance element has an impedance equivalent to a variation of impedance of the equipment. The impedance of the impedance element determines the line current. Connecting means connects the apparatus to the equipment and connects the impedance element in the line of the circuit in a manner whereby the magnitude of the current flowing through the compensating winding is determined by the impedance element, and disconnects the impedance element from the line of the circuit to detect the change in condition of the equipment.

Scanner means determines the magnitude of current through the compensating winding in resistance magnitude steps. The connecting means connects the impedance element in series with the control winding. A line adjusting resistor is provided. The connecting means connects the line adjusting resistor in series with the control winding.

The line adjusting resistor is connected in series circuit arrangement with the impedance element and the control winding and limits the current in the line of the circuit in a constant range and the impedance element limits the magnitude of current in the compensating winding.

A thyristor having anode, cathode and gate electrodes, and a release pulse generator coupled to the thyristor are provided. The sense winding is connected between the cathode and gate electrode of the thyristor in a manner whereby an output signal in the sense winding switches the thyristor to its conductive condition. The release pulse generator supplies release pulses of brief duration to the thyristor to switch the thyristor to its non-conductive condition.

In accordance with the present invention, a system for detecting a change in condition in any of a plurality of equipments, each of said equipments transmitting multifrequency signals, comprises a plurality of multifrequency receivers for receiving the multifrequency signals transmitted from the equipments and converting the signals into DC signals. A plurality of multifrequency originating registers are provided. Apparatus is provided for detecting a change in condition in any of the equipments by detecting a slight change in magnitude in DC in a line of circuit having a current which varies in accordance with a change of condition of the equipment each time multifrequency signals are transmitted by the equipment. The apparatus comprises a magnetic core. A control winding is wound on the core and connected in the line of the circuit for detecting the line current and producing a magnetic field in accordance with the line current. A compensating winding is wound on the core for producing a magnetic field having a direction which negates the magnetic field produced by the control winding. A drive winding is wound on the core. Drive means is connected to the drive winding for supplying drive current to the drive winding to produce a magnetic field in the drive winding. A sense winding is wound on the core for sensing the magnetic condition of the core. An impedance element has an impedance equivalent to a variation of impedance of the equipment. The impedance of the impedance element determines the line current and determines the detecting area for detecting the change in magnitude in DC in the line of the circuit. Connecting means connects the apparatus to the equipment and connects the impedance element in the line of the circuit and disconnects the impedance element from the line of the circuit. A connector connects each of the receivers to a corresponding one of the registers. The connector provides a multifrequency signal transfer line between an equipment and a selected multifrequency receiver when there is a change in magnitude in the DC. The selected receiver converts the signals into DC signals. A register removes the multifrequency signal transfer line when the DC signals are transferred from the receiver to the register.

Separate control means separately controls the connector and the multifrequency signal transfer line. The multifrequency signal transfer line includes switching means having a rectifier. The register controls the multifrequency signal transfer line by applying an electrical potential to the multifrequency signal transfer line via the rectifier.

The register includes a first relay energized by the output signal of the sense winding and deenergized by the detection of multifrequency signals. A second relay is energized by the suppression of the output signal of the sense winding for more than a specified period of time during the energization of the first relay. A third relay detects the multifrequency signals. A fourth relay is energized by the energization of the third relay and maintained energized during the provision of an output signal by the sense winding. The third relay is deenergized by energization of the fourth relay.

The connector comprises a plurality of selectors each corresponding to a corresponding one of the multifrequency receivers. Each of the selectors has a priority designation memory relay energized by the output of the next-preceding selector and deenergized by operation of another of the selectors. Means supplies a priority selection signal to a selector whose priority designation memory relay is energized.

Each of the selectors has a plurality of sets of start detecting relays and connector relays. Each set corresponds to a corresponding one of the multifrequency originating registers in a manner whereby when a selector is operated simultaneously by a plurality of multifrequency originating registers start detecting relays of the operated selector corresponding to operating multifrequency originating registers are energized thereby energizing corresponding connector relays. The earliest energized connector relay deenergizes other start detecting relays than that corresponding to the earliest energized connector relay. The energization of the start detecting relay and the connector relay of a set causes a multifrequency receiver to be connected to a multifrequency originating register.

In order that the invention may be readily carried into effect, it will now be described with reference to the accompanying drawings, wherein:

FIG. 1a is a block diagram illustrating the connection between a multifrequency receiver and a multifrequency originating register;

FIG. 1*b* is a block diagram illustrating the connection between a multifrequency receiver and a plurality of multifrequency originating registers;

FIGS. 2*a*, 2*b*, 2*c* and 2*d* are graphical presentations explaining the operation of apparatus for detecting the condition of equipment in accordance with a variation of the line current;

FIG. 3 is a circuit and block diagram of an embodiment of the condition change detecting apparatus of the invention;

FIG. 4*a* is a circuit diagram of an embodiment of the detector of the condition change detecting apparatus of the invention;

FIG. 4*b* is a schematic diagram of a modification of the detector of FIG. 4*a;*

Figure 10A:
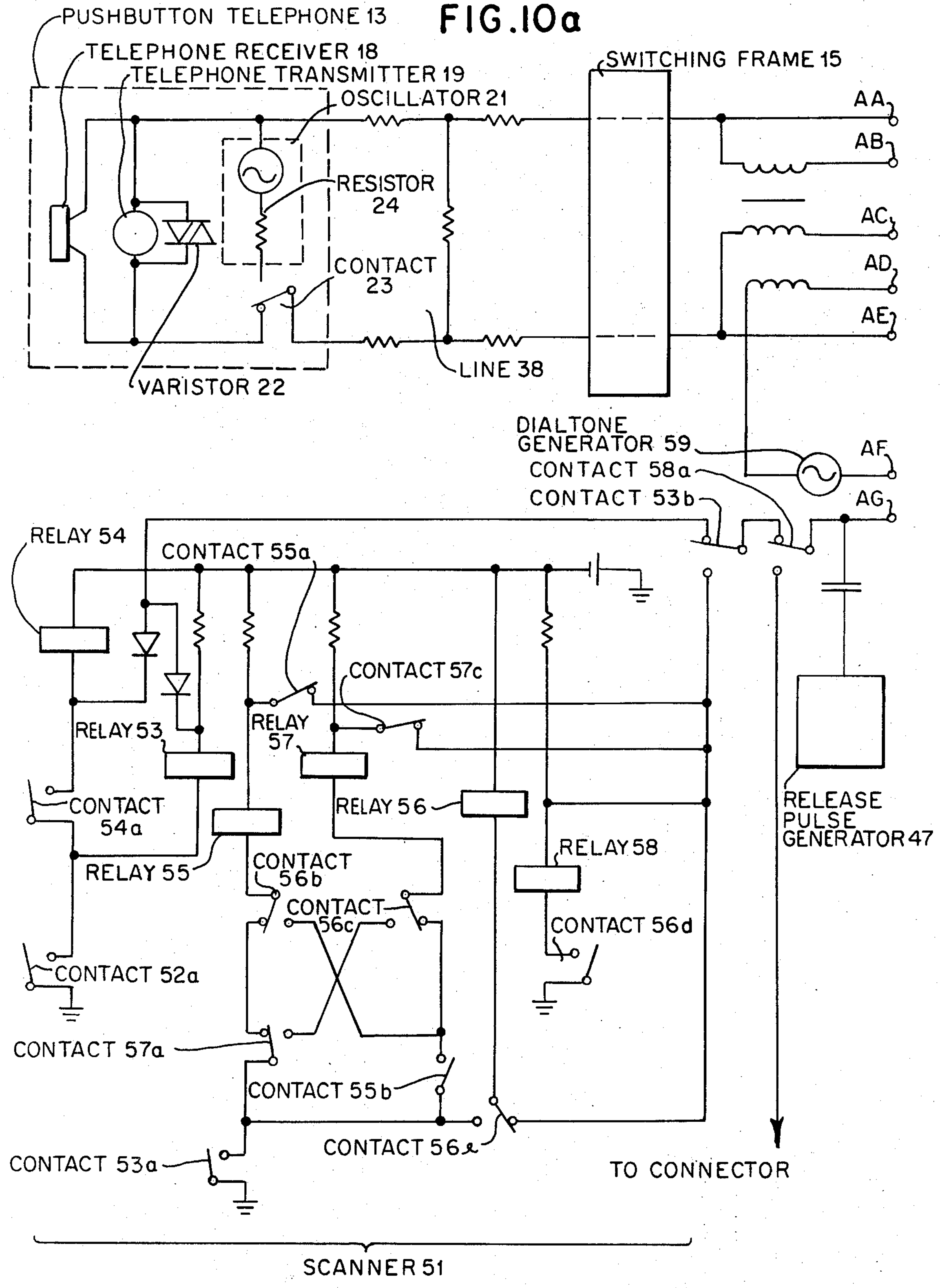
Figure 10B:
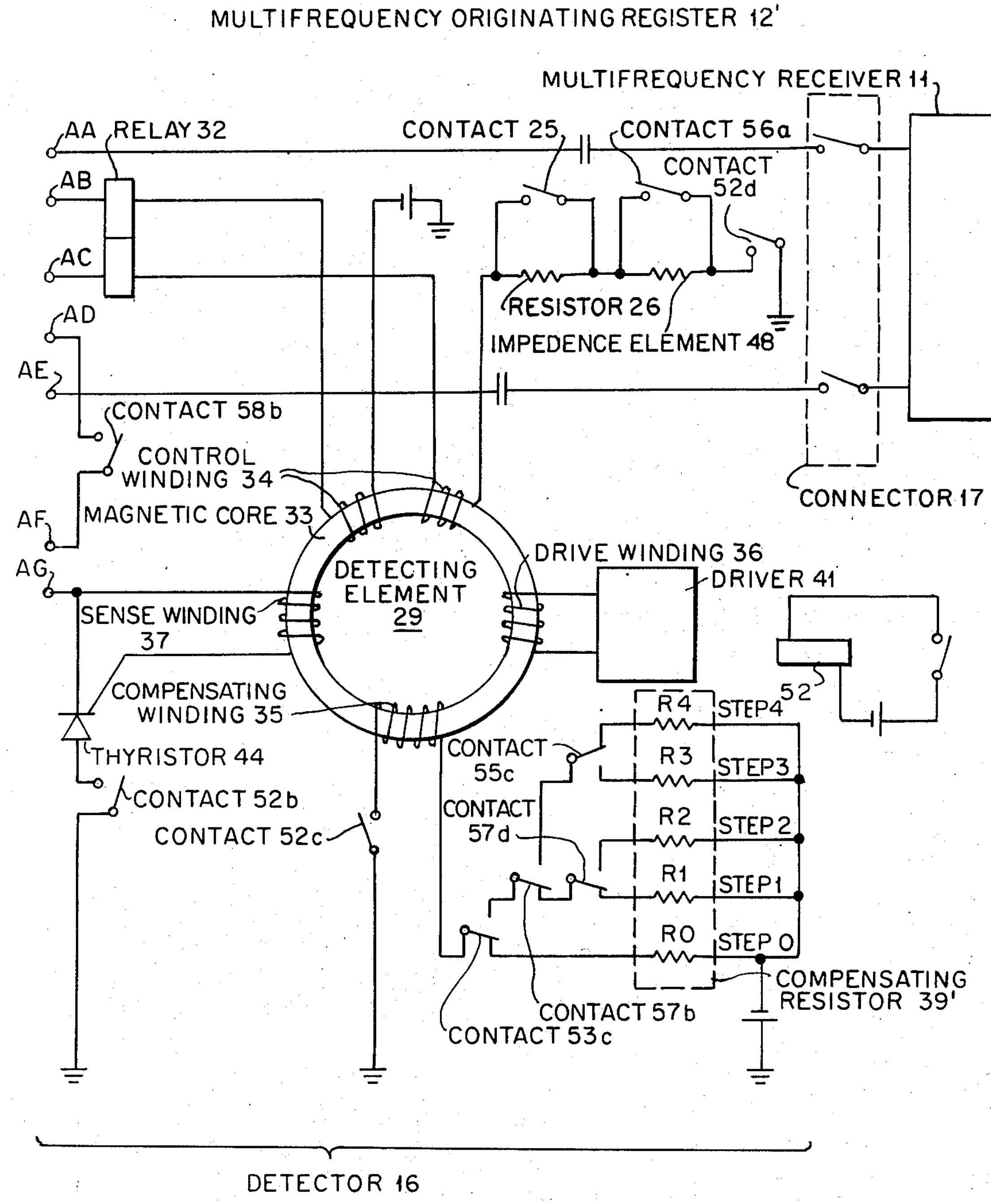
Figure 11A:
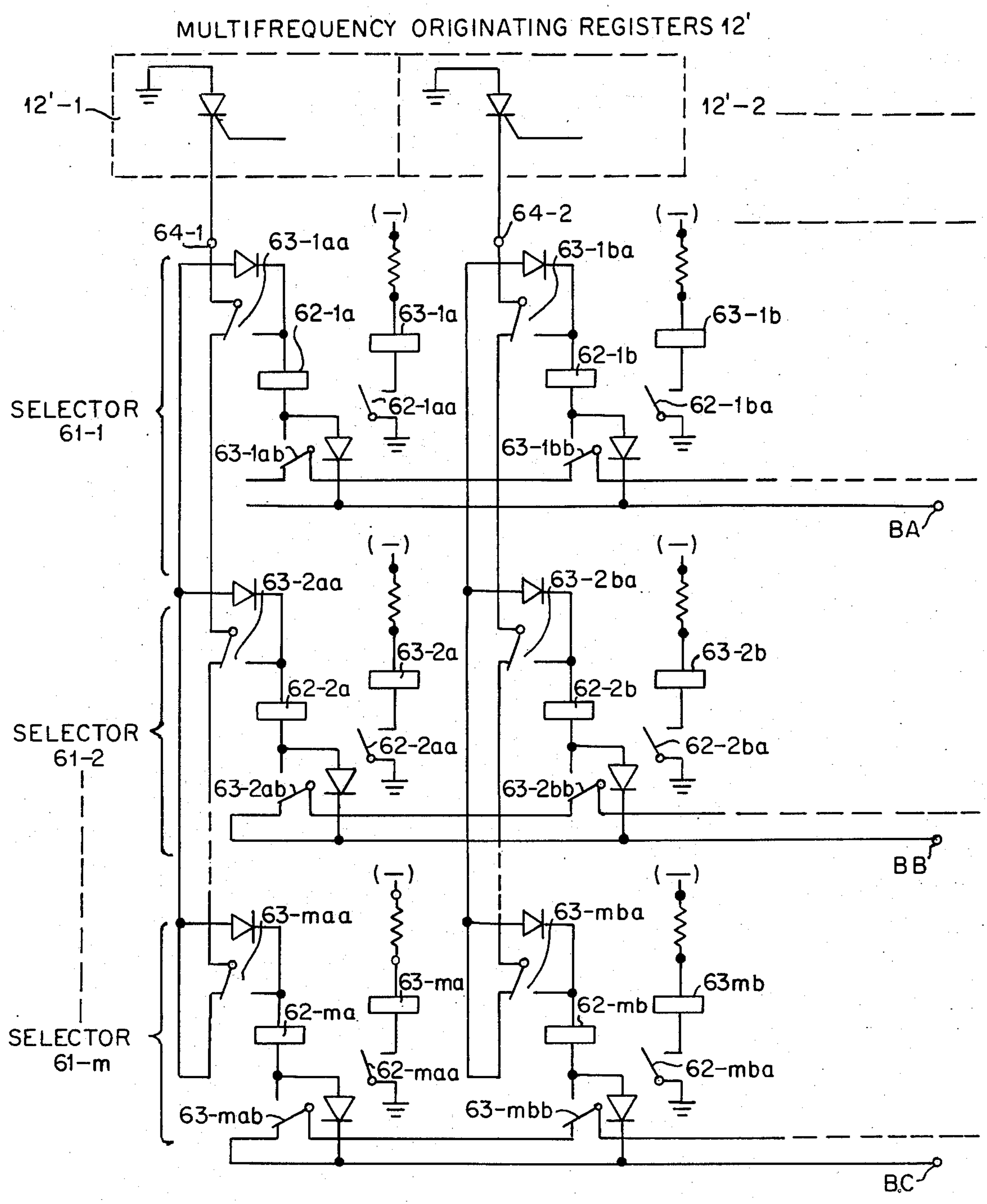
Figure 11B:
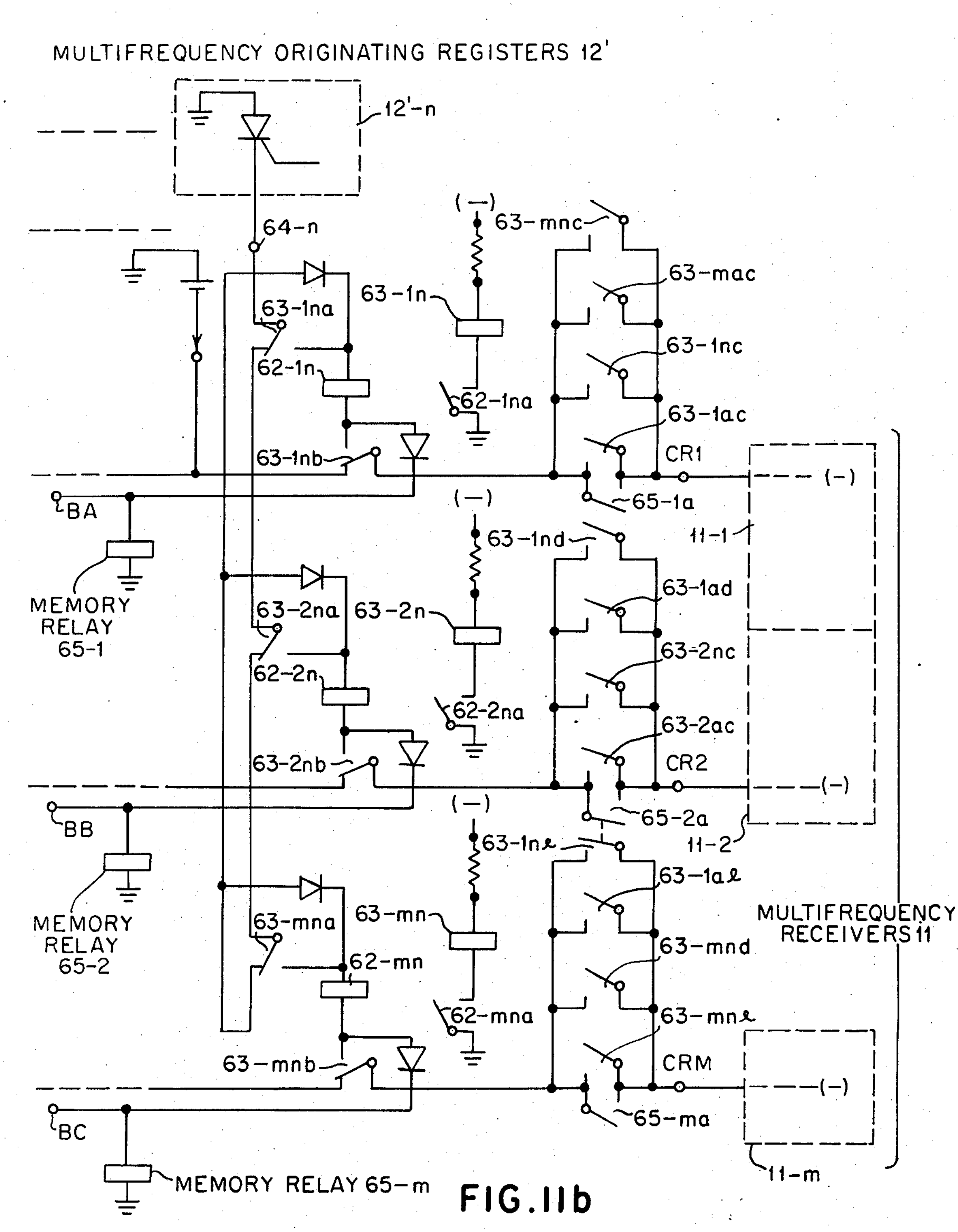
Figure 13:
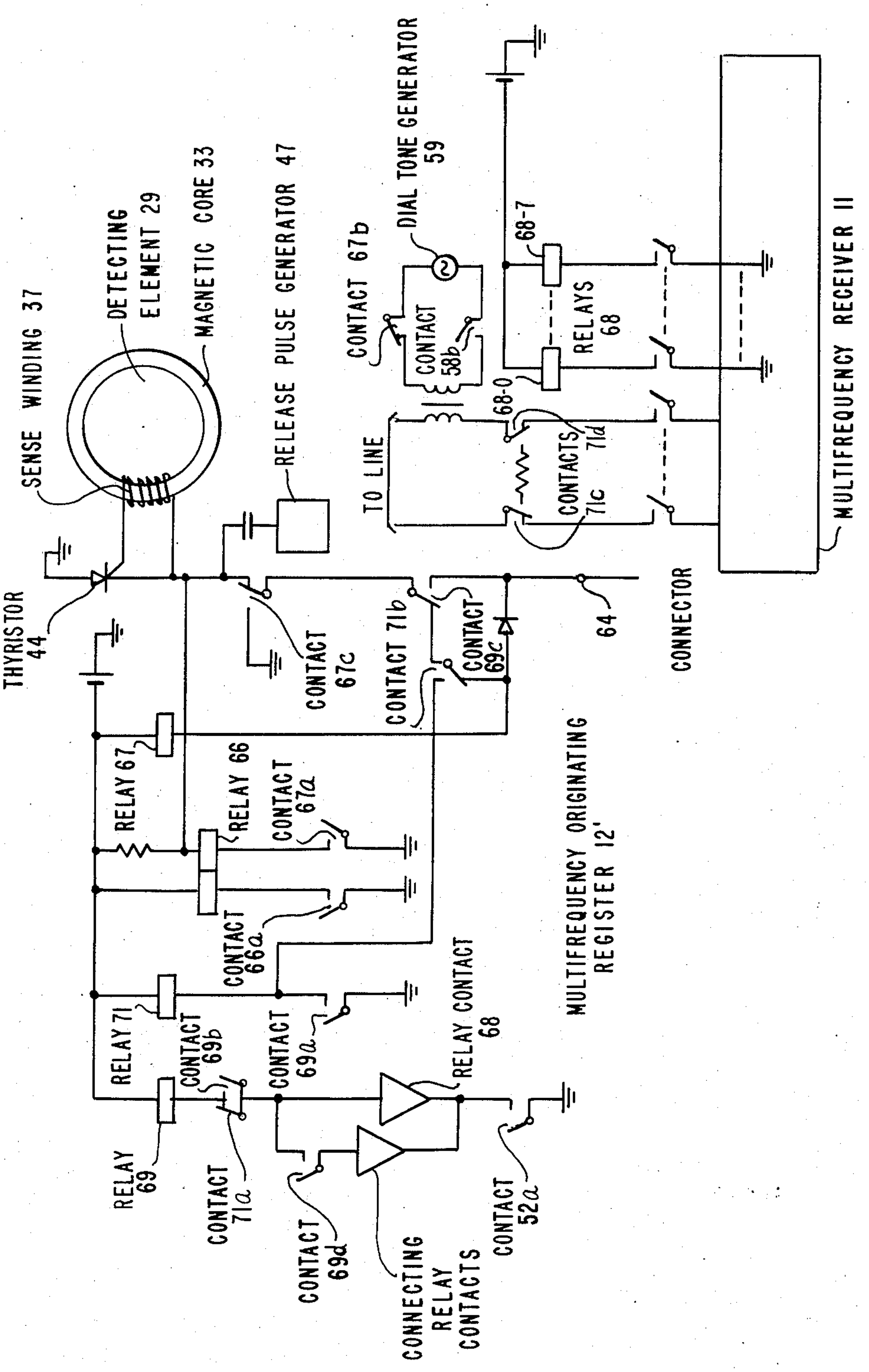
Figure 14:
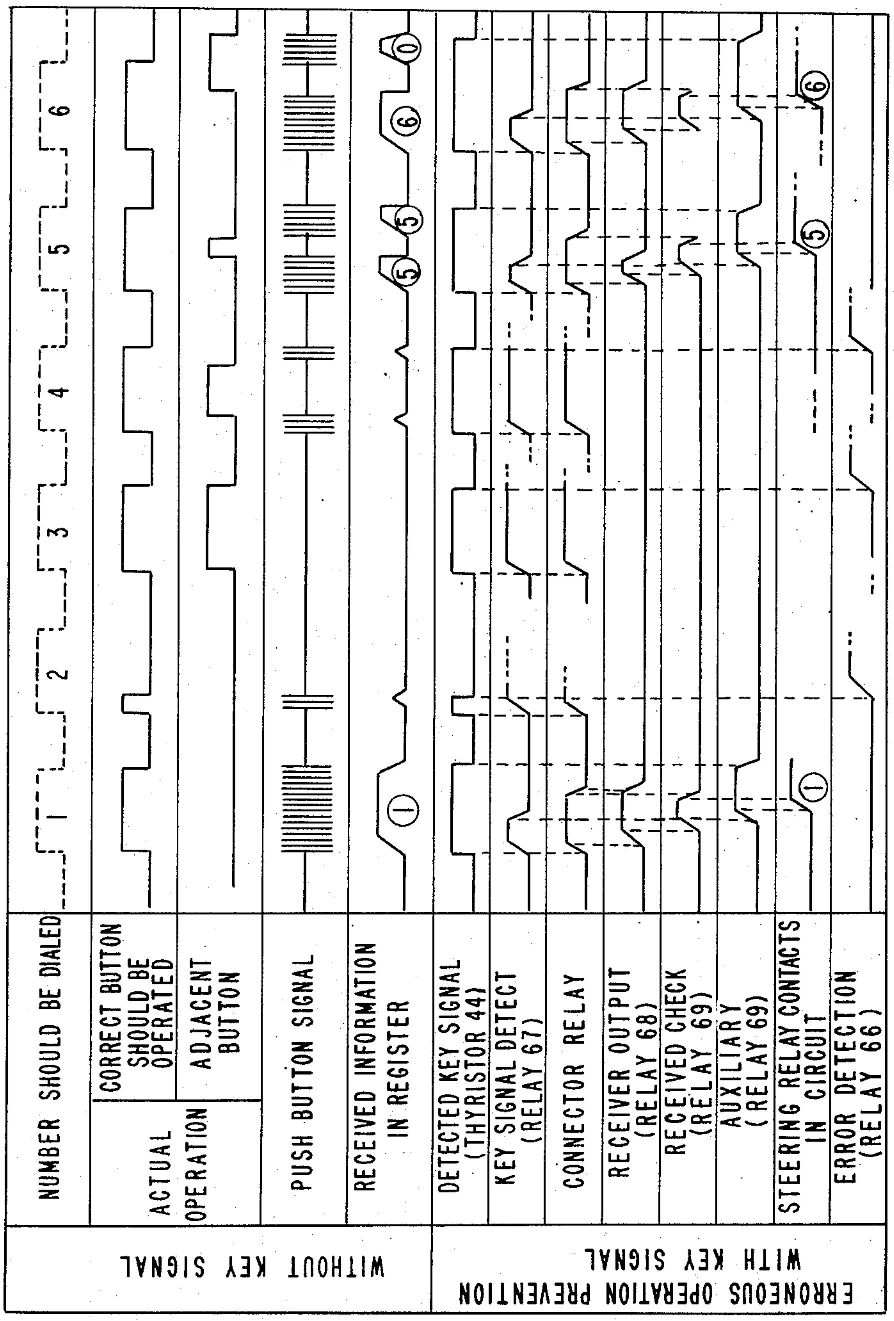
Figure 15A:
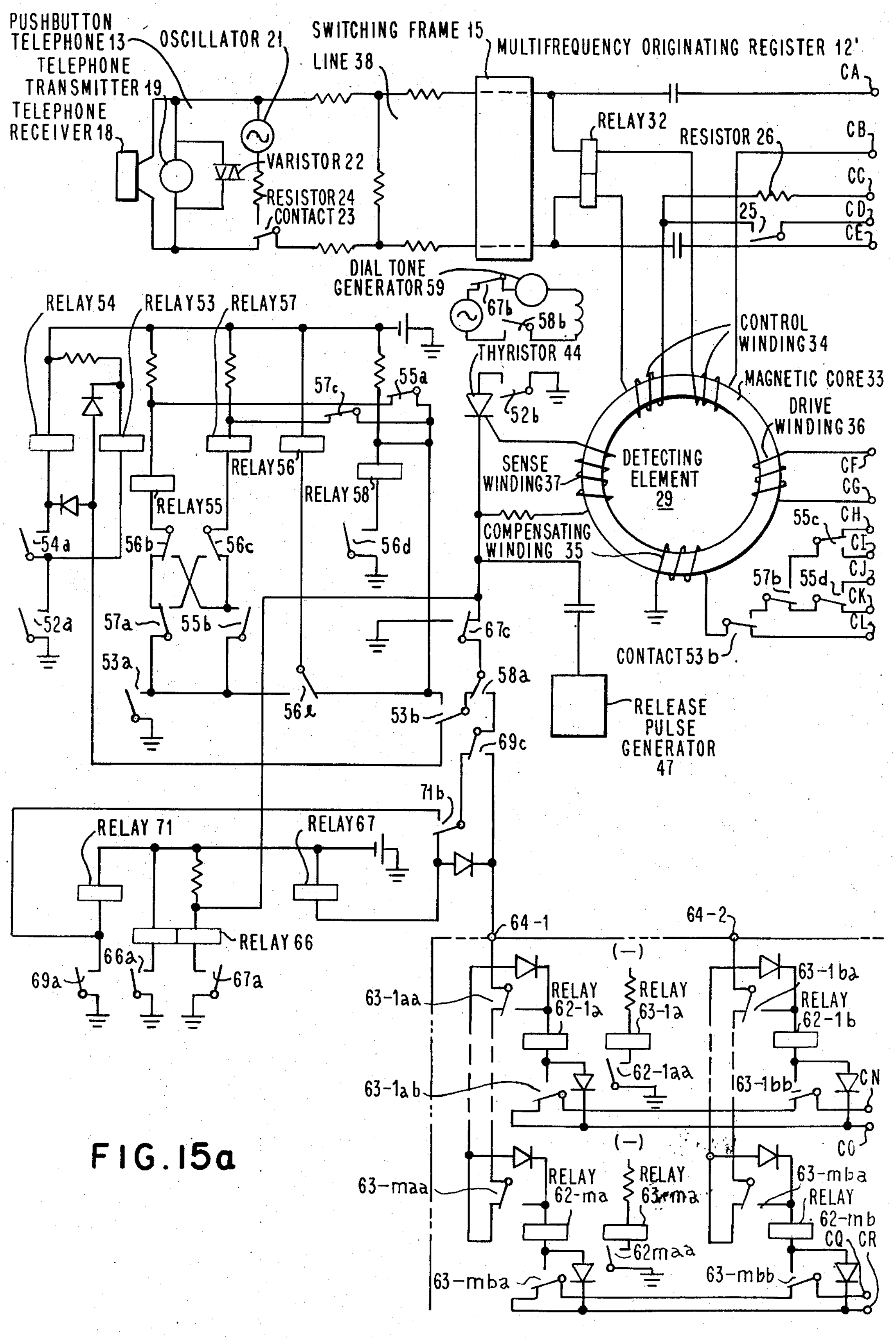
Figure 15B:
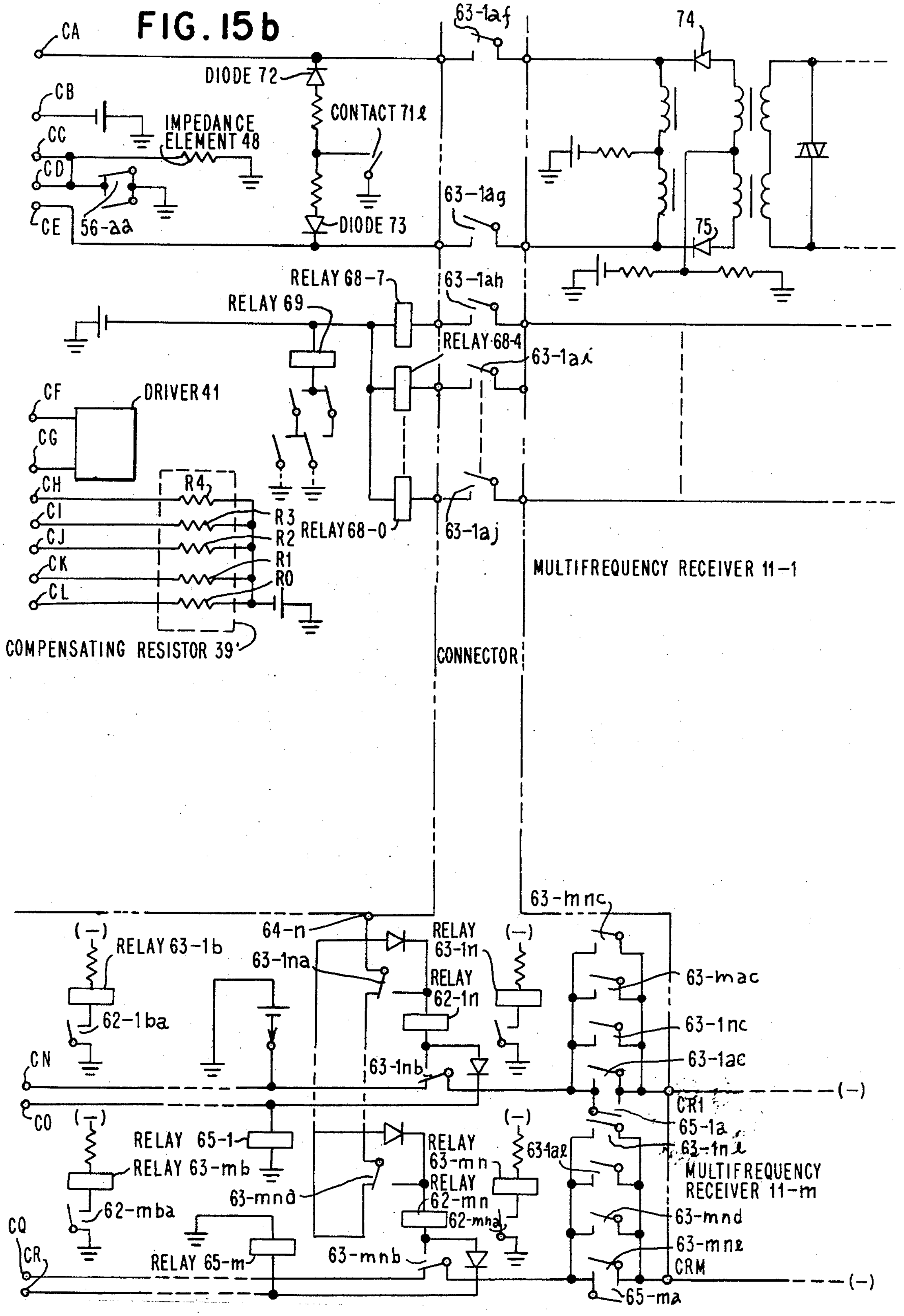

FIGS. 10*a* and 10*b*, which together constitute a single FIG., are a circuit diagram of an embodiment of the condition change detecting apparatus of the invention;

FIGS. 11*a* and 11*b*, which together constitute a single FIG., are a circuit diagram of a selective circuit of the connector which connects the multifrequency originating register and the multifrequency receiver;

FIGS. 12*a*, 12*b*, 12*c* and 12*d* are schematic diagrams of a connecting circuit of the connector which connects the multifrequency originating register and the multifrequency receiver;

FIG. 13 is a circuit diagram of an embodiment of the erroneous operation preventing circuit of the invention included within the multifrequency originating register;

FIG. 14 is a plurality of graphical presentations for explaining the operation of the erroneous operation preventing circuit of FIG. 13; and FIGS. 15*a* and 15*b*, which together constitute a single FIG., are a circuit diagram of an embodiment of a system in which a multifrequency receiver is utilized in common with the condition change detecting apparatus of the invention.

In the FIGS., the same components are identified by the same reference numerals.

Figures 1A, 1B, 2A, 2B, 2C, 2D:
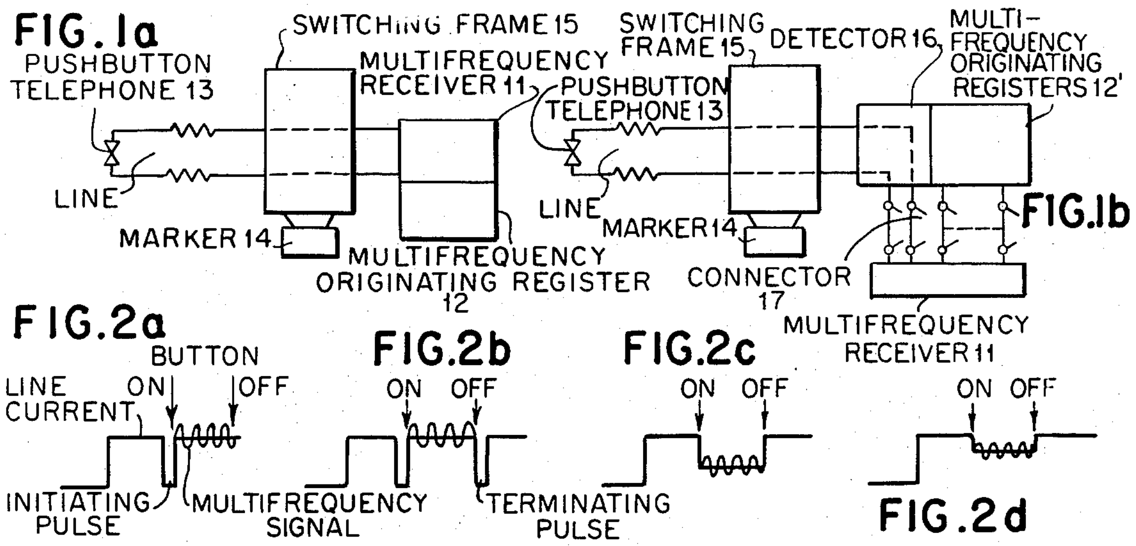

FIG. 1*a* illustrates the permanent connection of a multifrequency receiver 11 to a multifrequency originating register 12. In the system of FIG. 1*a*, when a subscriber removes the receiver of his pushbutton telephone 13 from its cradle, such removal is detected by a marker 14 and said telephone is connected to the multifrequency originating register 12 via a switching frame 15.

In the system of FIG. 1*a*, since the multifrequency receiver 11 is housed in the multifrequency originating register 12, multifrequency signals sent from the subscriber's pushbutton, multifrequency or Touch Tone telephone 13 are received by said multifrequency originating register. The multifrequency receiver 11 is therefore connected to the pushbutton telephone 13 until the subscriber terminates dialing on said telephone. The holding time is consequently long.

FIG. 1*b* illustrates a system in which a single multifrequency receiver 11 is utilized in common with a number of multifrequency originating registers 12'. In the system of FIG. 1*b*, each of the multifrequency originating registers 12' is provided with a corresponding detector 16. When the subscriber removes his pushbutton telephone 13 from its cradle, such removal is detected by the marker 14 and said telephone is connected to the multifrequency originating register 12' via the switching frame 15. In this case, the multifrequency originating register 12' is not connected to the multifrequency receiver 11.

As soon as the detector 16 determines that a subscriber has touched the button of a pushbutton telephone 13, the multifrequency originating register 12' initiates the operation of a connector 17 to connect into the circuit, an idle multifrequency receiver 11. When the multifrequency receiver 11 is connected to the multifrequency originating register 12', said receiver receives a multifrequency signal of one digit transmitted from the multifrequency or pushbutton telephone 13. The information of one digit received by the multifrequency receiver 11 is converted into a DC signal in said receiver and is transferred to the multifrequency originating register 12'. The multifrequency receiver 11 is thus connected to the multifrequency originating register 12' only while the multifrequency signal of one digit is received and is converted into a DC signal by the receiver and is transferred to said multifrequency originating register. The holding time of the multifrequency receiver 11 may therefore be made very short.

FIGS. 2*a*, 2*b*, 2*c* and 2*d* illustrate the determination of the touching of a button of the pushbutton telephone 13 by a subscriber. In each of FIGS. 2*a*, 2*b*, 2*c* and 2*d*, the determination of the touching of the telephone button is made as a result of a variation of direct current. In FIG. 2*a*, the mechanism of the telephone is set so that the DC may be briefly interrupted at the initiation or commencement of each button operation by an initial pulse. The initial pulse is detected by the multifrequency originating register 12.

In FIG. 2*b*, a terminating pulse is provided when the telephone button is released by the subscriber. In FIG. 2*c*, when the button of the telephone is touched by the subscriber, a high resistance is connected in a DC circuit in said telephone, and the line current is reduced to a magnitude within a specific range not influenced by the magnitude of the line resistance. The current is detected by the multifrequency originating register 12.

In FIG. 2*d*, when the button of the telephone 13 is touched by the subscriber, a low resistance is connected in the DC circuit in said telephone and the slight variation in the magnitude of current is detected or determined by the multifrequency originating register 12. The variation of line current is influenced by the magnitude of the line resistance.

In each each of FIGS. 2*a* and 2*b*, the mechanism of the telephone is complex. In FIG. 2*c*, a considerable current variation results in considerable noise. Furthermore, it is necessary to short-circuit the high resistance in an AC circuit. It is therefore difficult to utilize FIG. 2*c*. For this reason, the arrangement of FIG. 2*d*, which requires the least modification of the telephone, is the most desirable.

In the arrangement of FIG. 2*d*, however, wherein a slight variation of current is detected or determined, the reduced current magnitude is varied by the magnitude of the line resistance. Furthermore, the line current is varied by the variation of carbon resistance of the telephone transmitter, even when the button of the telephone is not touched by the subscriber. When the button of the telephone is touched, the magnitude of the resistance is influenced by the magnitude of the line current and cannot become constant. The resistance magnitude cannot become constant because the oscillator comprises a semiconductor element. It is therefore difficult to determine the touching of the button due to the reduction of the magnitude of the DC.

The system and apparatus of the invention have solved all the problems of the arrangement of FIG. 2*d* and have facilitated the stabilization of DC resistance of the oscillator by suppressing the variation of carbon resistance of the telephone transmitter. Furthermore, the line current is automatically adjusted, the detecting area corresponding to the magnitude of the line resistance is automatically set,.and high speed determination is made of minute currents. It is therefore possible to ultilize a multifrequency receiver in common and to simultaneously improve the prevention of the reception of erroneous signals due to erroneous operation of the button of his telephone by a subscriber.

Figures 3, 5:
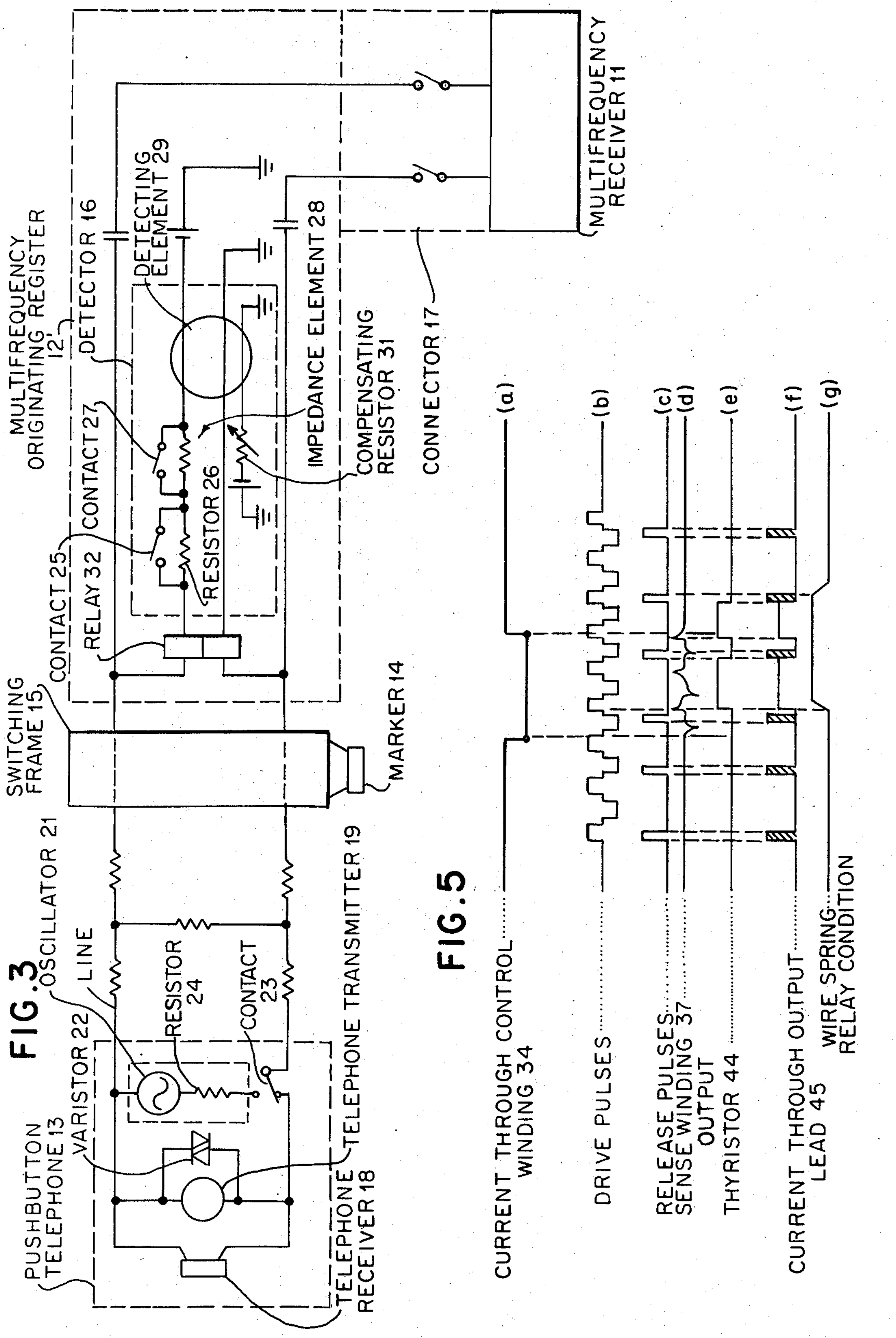
FIG. 5 is a plurality of graphical presentations for explaining the operation of the detector of FIGS. 4*a* and 4*b;*

FIG. 3 is a general circuit diagram of the condition change detecting apparatus of the invention. In FIG. 3, a pushbutton, multifrequency or Touch Tone telephone 13 comprises a telephone receiver 18, a telephone transmitter 19 and an oscillator 21. The telephone transmitter 19 is short-circuited by a varistor 22. When the subscriber touches a button of the telephone 13, a contact 23 of the telephone is operated and is switched from a talking circuit connecting the telephone receiver 18 and the telephone transmitter 19 to a position in which it connects the oscillator 21 to the circuit.

The varistor 22 limits the instantaneous variation of the carbon resistance of the transmitter 19 to a constant value. The oscillator 21 exhibits a constant DC resistance magnitude 24 within a specific current range. The varistor 22 and the DC resistor 24 of the oscillator 21 may be set without adversely affecting the characteristic of the telephone 13. Thus, after the telephone 13 is disconnected from the multifrequency originating register 12', said telephone may be utilized in exactly the same manner as general pushbutton telephones.

The subscriber is connected to the multifrequency originating register 12' via the switching frame 15. The multifrequency originating register 12' includes a detector 16. The detector 16 comprises a line current adjusting circuit having a contact 25 and a resistor 26. The detector 26 further comprises an impedance setting circuit having a contact 27 and an impedance element 28. The detector 26 further comprises a detecting element 29 and a compensating resistor 31. The output of the detector 16 initiates or commences the operation of the connector 17 via a circuit which is not shown in FIG. 3 in order to maintain the clarity of illustration. The connector 17 connects into the circuit the multifrequency receiver 11.

Figure 4A:
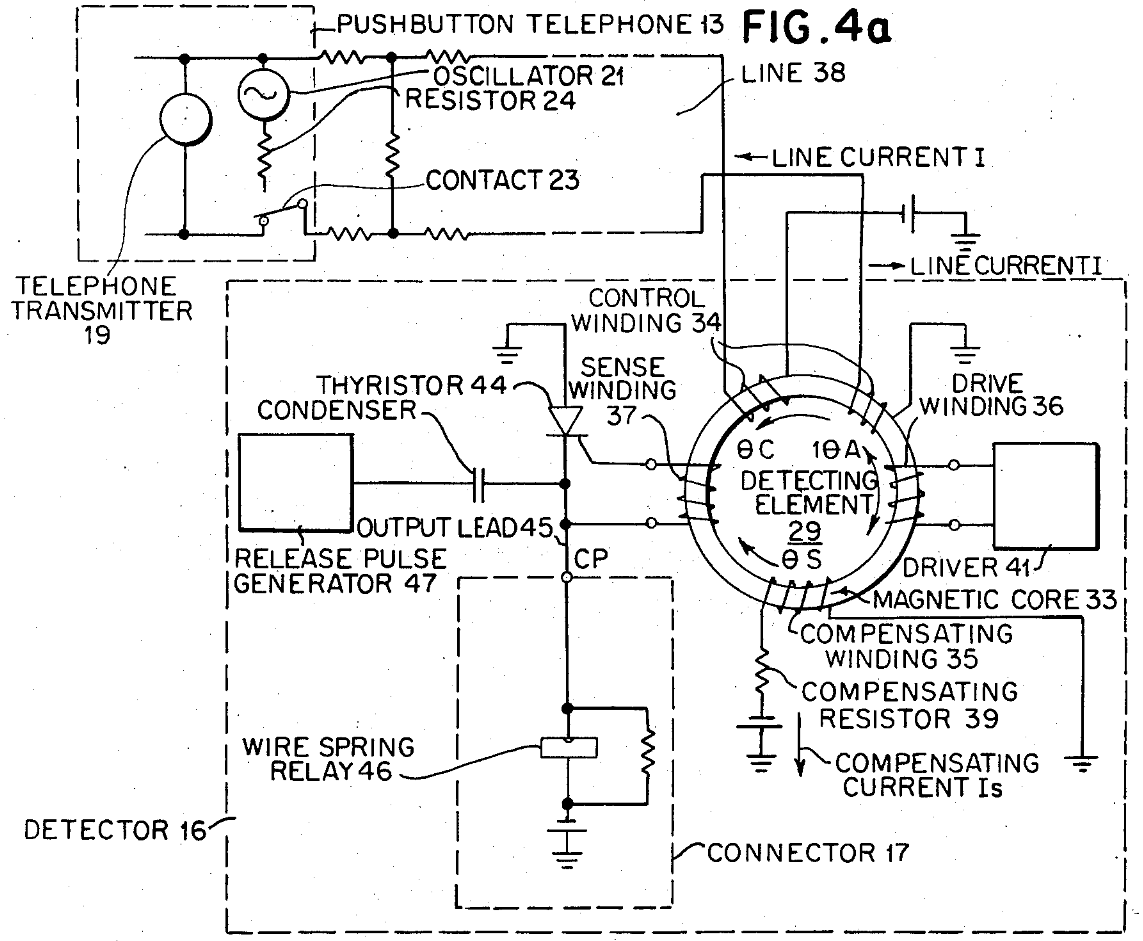

In FIG. 4a, the detecting element 29 of the detector 16 comprises a magnetic core 33 having a square hysteresis loop, a control winding 34 wound on said core, a compensating winding 35 wound on said core in spaced relation with said control winding, a drive winding 36 wound on said core in spaced relation with said control winding and said compensating winding, and a sense winding 37 wound on said core in spaced relation with said control winding, said compensating winding and said drive winding. The control winding 34 is connected in series with the line 38, so that a current corresponding to the line current flows in said control winding.

The compensating winding 35 is wound in a manner whereby it produces a magnetic field in the reverse direction to the magnetic field produced by the control winding 34. The strength of the magnetic field produced by the compensating winding 35 is varied in accordance with the resistance value of a compensating resistor 39 connected to said compensating winding. The drive winding is continuously driven by bipolar pulses supplied by a driver 41. When the strength of the magnetic field produced by the control winding 34 equals the strength of the magnetic field produced by the compensating winding 35, and the two magnetic fields cancel each other out, a voltage is generated in the sense winding 37 by the drive pulses.

Figure 4B:
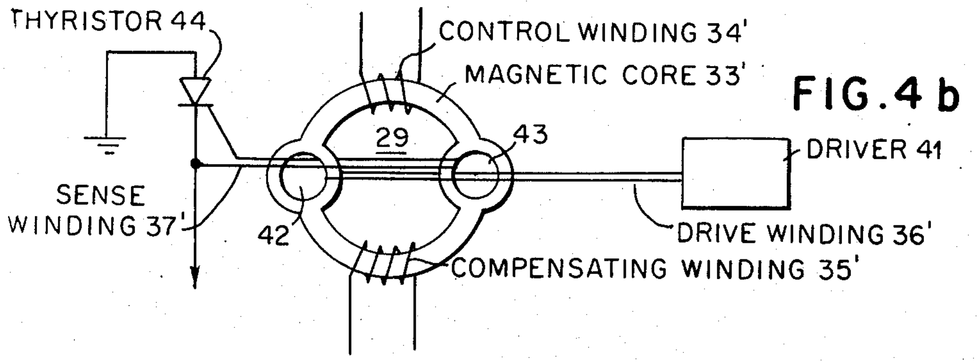

As shown in the modification of FIG. 4*b*, which is the preferred embodiment of the detecting element 29, the magnetic core 33' comprises a transfluxor having two small apertures or holes 42 and 43 formed therethrough and having a square hysteresis loop. The magnetic core 33 and the magnetic core 33' are of annular configuration. The holes 42 and 43 in the magnetic core 33' form two diametrically opposed annuli in the principal annulus, all the annuli being coplanarly disposed.

The drive winding 36' is wound around the annulus formed by the apertures 42 and 43 and the sense winding 37' is wound around the annulus formed by the apertures 42 and 43. The control winding 34' is wound about the major annulus of the magnetic core 33' and the compensating winding 35' is wound around said major annulus in diametric opposition to said control winding. The compensating winding 35' thereby increases the magnetic field control efficiency around the minor annuli formed by the apertures 42 and 43 and detects the variation of the current in the control winding 34' with great sensitivity.

FIG. 5 explains the operation of the detecting element 29 of FIGS. 4a and 4b. Curve *a* of FIG. 5 shows the current flowing through the control winding 34. Curve *b* shows the drive pulses supplied by the driver 41. Curve *c* shows the release pulses. Curve *d* shows the output pulses of the sense winding 37. Curve *e* shows the condition of a thyristor 44. Curve *f* shows the current flowing through an output lead 45 of FIG. 4*a*. Curve *g* of FIG. 5 shows the condition of a wire spring relay 46 of FIG. 4*a*.

In FIG. 4*a*, the control winding 34 is divided into two portions. Both portions of the control winding 34 are connected in the tested line and are maintained in balanced so that they may not be influenced by the AC interference signals induced in said line. If current flows through the control winding 34, the magnetic core 33 is saturated. If current does not flow through the control winding 34, the magnetic core 33 is not saturated. Therefore, when drive pulses are supplied by the drive 41 to the drive winding 36, an inversion of magnetization occurs in the magnetic core 33 due to the magnetic field produced by said drive winding.

When magnetization inversion occurs in the magnetic core 33, an output signal is produced at the sense winding 37 and a gate current flows between the gate and the cathode of the thyristor 44, said gate being connected to one end of said sense winding and said cathode being connected to the other end of said sense winding. When a current flows between the gate and the cathode of the thyristor 44, said thyristor is switched to its conductive condition and the wire spring relay 46 of the connector 17 is energized. Once the thyristor 44 is in its conductive condition, it continues in such condition, so that a release pulse generator 47 is instantaneously connected to the cathode of the thyristor 44. The release pulse generator 47 applies a positive inverse potential, as shown in curve *c* of FIG. 5, to the thyristor 44. When the input to the gate of the thyristor 44 is terminated, said thyristor is released, or switched to its non-conductive condition, by the release pulse supplied by the release pulse generator 47. When the thyristor 44 is in its non-conductive condition, its output ceases.

The thyristor 44 is switched to its non-conductive condition instantaneously, even if it receives pulses during the time that gate signals are supplied to its gate. The wire spring relay 46 is not deenergized, however, since its operation and release characteristics are not as precise as those of the thyristor 44. When the supply of release pulses to the thyristor 44 is terminated, said thyristor is again switched to its conductive condition by the next gate signals supplied to its gate, and said thyristor produces a continuous output. The thyristor 44 may be switched in condition in a very short period of time, so that the periods and pulse lengths of the drive pulses and release pulses (curves *b* and *c* of FIG. 5) may be set with facility to magnitudes which will not affect the operation of the wire spring relay 46. That is, the thyristor 44 is switched to its conductive condition when there is an output of the sense winding 37 supplied to the gate of said thyristor. The thyristor 44 is switched to its nonconductive condition when there is no output of the sense winding 37. The thyristor 44 may thus be controlled via its gate electrode.

The breakdown voltage and current capacity of the thyristor 44 may be made large. On the other hand, however, it may be controlled via a small gate input in a very brief period of time and may exhibit self-holding and rectifying action. Driving the thyristor 44 with the detecting element 29 enables said thyristor to be controlled via bipolar output pulses supplied by the sensing winding 37 of said detecting element and also permits the output of said detecting element to be converted into rectified DC thereby providing a high speed, high sensitivity switching device capable of detecting small currents and current variations and applicable to large currents and voltages.

The principle of operation of the detecting element 29 is explained with reference to FIG. 6. It is assumed that a current Is flows through the compensating winding 35 and produces a constant magnetic field $\theta s$. It is also assumed that line current I flows through the control winding 34 and is varied, and that the magnetic field $\theta c$ produced by said line current is varied as $\theta c0$, $\theta c1$, $\theta c2$ and $\theta c3$. The relations of these magnetic fields are illustrated as conditions I, II, III and IV of FIG. 6.

If the difference $\theta c-\theta s$ of the magnetic field $\theta c$ produced by the control winding 34 and the magnetic field $\theta s$ produced by the compensating winding 35 is below a specific magnitude, as in the conditions II and III of FIG. 6, inversion of magnetization occurs in the magnetic core 33 of FIG. 4*a*. That is, if $(\theta c-\theta s)$ is less than $(\theta 2-\theta A)$, magnetization inversion occurs in the magnetic core 33. When magnetization inversion occurs in the magnetic core 33, the sense winding 37 produces sense signals when the drive winding 36 produces a magnetic field $\pm\theta A$. The magnetic field $\pm\theta A$ is applied to the sense winding 37.

Figure 6:
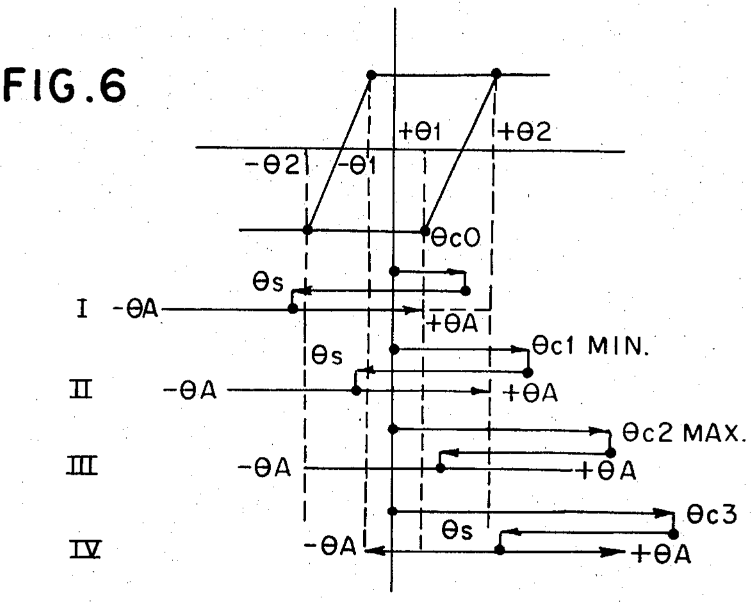
FIG. 6 is a graphical presentation explaining the principle of determination of condition by the detector of FIGS. 4*a and 4b;*

If the difference between the magnetic field $\theta c$ produced by the control winding 34 and the magnetic field $\theta s$ produced by the compensating winding 35 is greater than a specified magnitude, as in the conditions I and IV of FIG. 6, there is no occurrence of an inversion of magnetization in the magnetic core 33 of FIG. 4*a*. That is, there is no magnetization inversion when $(\theta c-\theta s)$ is greater than $(\theta 1-\theta A)$. When there is no magnetization inversion in the magnetic core 33, there is no signal provided by the sense winding 37, even if the magnetic field $\pm\theta A$ produced by the drive winding 36 is applied to said sense winding. Therefore, if the magnetic field $\theta s$ produced by the compensating winding 35 is made constant, the area of magnetization inversion of the magnetic core 33 may be determined by the magnitude of the magnetic field $\theta c$ produced by the control winding 34. The magnitude of the line current I flowing through the control winding 34 may thus be determined by whether or not signals are produced in the sense winding 37.

The area in which the magnetization condition of the magnetic core 33 is inverted and sense signals are provided by the sense winding 37, as in the conditions II and III of FIG. 6, is called the detecting area. The area in which the magnetization condition of the magnetic core 33 is not inverted and no sense signal is provided by the sense winding 37, as in the conditions I and IV of FIG. 6, is called the non-detecting area. As hereinbefore described, by utilizing the compensating winding 35 to produce the magnetic field $\theta s$, it is possible to control the production of signals by the sense winding 37 in accordance with the magnitude of the magnetic field $\theta c$ produced by the control winding 34. The magnitude of the line current I flowing through the control winding 34 may thus be determined by supervising the output of the sense winding 37.

The precision of the detection or determinatin of the magnitude of the line current flowing through the control winding 34 is determined by the ampere turns AT of the winding and may therefore be arbitarily set by increasing or decreasing the number of turns of said control winding. The detecting area of the magnitude of the line current flowing through the control winding 34 may also be determined by the ampere turns of the pulses supplied by the driver 41 to the drive winding 36, and may therefore be set without relation to external conditions. That is, the central magnitude of the magnetic field represented in FIG. 6 is at the point of $\theta c-\theta s$ and said central magnitude may be arbitarily set by suitable selection of $\theta s$.

A detecting characteristic may be provided which is such that the area of the detected magnetic field is the area of $\pm(\theta A-\theta 2)$ from the central magnitude, and the detecting area may be freely selected by suitable selection of $\theta A$. The strength of the magnetic field may be expressed as ampere turns divided by the magnetic path length. Therefore, if the turns and the magnetic path length are constant, this relationship may be replaced by the relationship between the line current I flowing through the control winding 34 and the compensating current Is flowing through the compensating winding 35, as shown in FIG. 7.

Figure 7:
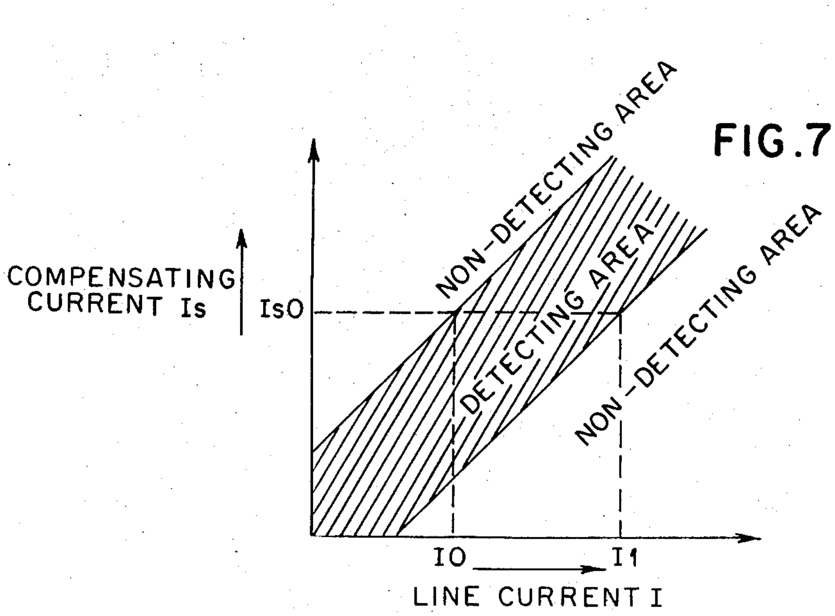
FIG. 7 is a graphical presentation of the relation between the line current, the compensating current and the signal detecting area.

FIG. 7 illustrates how the detecting area is varied by the line current I flowing through the control winding 34 and the compensating current I*s* when the number of turns of said control winding is equal to the number of turns of the compensating winding 35. It is shown in FIG. 7 that if the compensating current magnitude is I*s*0, a sense signal may be provided by the sense winding 37 when the line current I is greater than I0 and less than I1. Arbitary line current may be detected by arbitrarily setting I*s*0.

The area of the detecting current (I0-I1) may also be arbitarily set, completely independently from the compensating current I*s*, by adjusting only the ampere turns of the drive winding 36. It is thus evident from FIG. 7 that the detecting element 29 is different from the conventional switching element for determining two conditions ON and OFF, and may determine or detect a specific current magnitude, since it may detect three magnitudes OFF, ON and OFF. The detecting element 29 may distinguish a slight current variation caused by the operation of the button of the pushbutton telephone from a reduction in current caused by cradling of the telephone or transient phenomena. This provides a current detecting element capable of detecting three magnitudes with rapidity and great sensitivity. In FIG. 7, the abscissa represents the line current I and the ordinate represents the compensating current I*s*.

Figure 8:
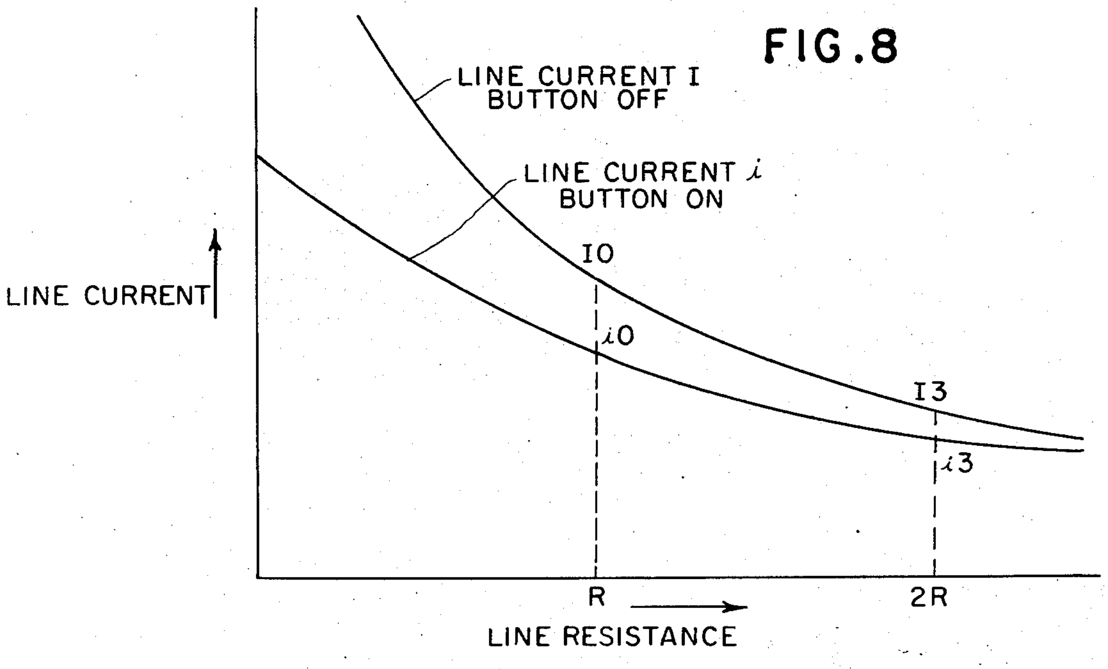
FIG. 8 is a graphical presentation illustrating the relation between the line resistance and the line current.

FIG. 8 shows the influence of the line resistance on the line current. In FIG. 8, the abscissa represents the line resistance and the ordinate represents the line current. In FIG. 8, the line current *i* flows when the button of the pushbutton telephone 13 of FIG. 4*a* is touched, so that said button is ON. The line current I flows when the button of the pushbutton telephone 13 is released or untouched, so that said button is OFF. When the magnitude of the line resistance is R, the line currents are I0 and i0. When the magnitude of the line resistance is 2R, the line currents are I3 and *i*3. It is therefore difficult to detect or determine the difference between I0 and *i*0 and the difference between I3 and *i*3 without relation to the magnitude of the line resistance in FIG. 8, in which *i* is greater than I at some magnitudes such as, for example, when *i*0 is greater than I3.

For the foregoing reason, it is necessary to set the detecting area in correspondence with the line resistance magnitude. The detecting areas may be set, in accordance with the invention, suitably to arbitrary line resistance magnitudes by detecting the magnitude of the line resistance and automatically correcting said magnitude to set it in a specific area, and arranging the detecting areas in the form of steps along the line current and scanning said areas.

Figure 9:
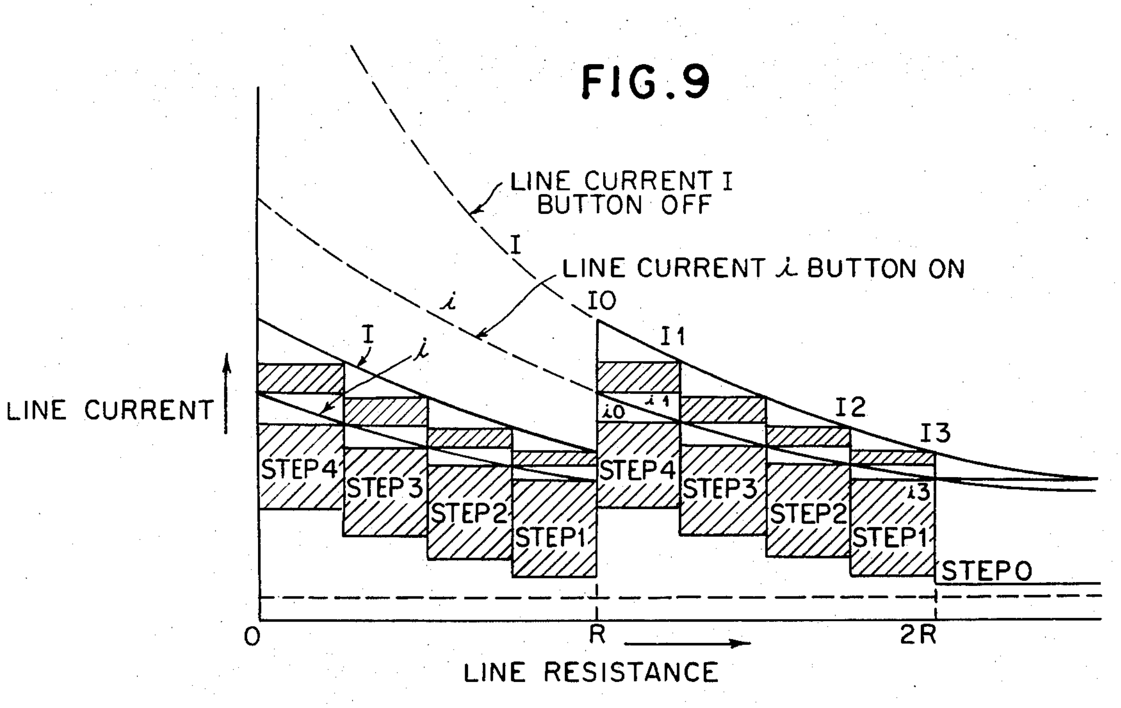
FIG. 9 is a graphical presentation explaining the method of setting the signal detecting area.

FIG. 9 illustrates the method of automatically correcting the line current and the method of setting and arranging the detecting area. In FIG. 9, Step 0 is a detecting area provided for determining the magnitude of the line resistance and Steps 1, 2, 3 and 4 are detecting areas corresponding to the various line resistances. Before setting the detecting areas, a resistance having a magnitude R is connected in the line and the line or ringing current is supervised by the current detector 16, as hereinbefore described with reference to FIG. 4*a*.

If the magnitude of the line resistance is less than R, there is no output signal in the sense winding 37 of the detecting element 29 of FIG. 4*a* in the detecting area of Step 0, and the detector 16 commences the setting of the detecting areas without disconnecting the connected resistance R. If the magnitude of the line resistance is greater than R, an output signal is provided in the sense winding 37 in Step 0, so that the connected resistance magnitude R is short-circuited by the detector 16 and the setting of the detecting areas is initiated or commenced upon the failure of the sense winding 37 to provide an output signal. The line resistance magnitude is therefore always corrected to be in the range of R to 2R and the detecting areas may be set within such range.

If the detecting area is divided into Steps 1, 2, 3 and 4, it is only necessary to determine the difference between the current I0 or I1 which flows when the button of the pushbutton telephone is untouched and the current *i*0 or *i*1, which flows when said button is touched in Step 4. It then becomes unnecessary to detect the currents I2 and I3 which flow when the button of the pushbutton telephone is untouched in Step 1 and the currents *i*0 or *i*1 in Step 4. That is, by setting the detecting area as shown in FIG. 9, it is possible to detect the change of the condition of the pushbutton telephone 13 of FIG. 4*a* even when the magnitude of current which flows when the button of said telephone is touched is greater than the magnitude of the current which flows when said button is untouched such as, for example, *i*0, *i*1 are greater than I2, I3. This is because it is only necessary that I be larger than *i* in each step.

By dividing the detecting area into several steps along the line current, as hereinbefore described, the change of condition of the pushbutton telephone 13 may be detected or determined without relation to the magnitude of the line resistance. In order to accomplish this, however, it is necessary to set the condition change detecting area of each pushbutton telephone 13 to correspond to the magnitude of the line resistance in the detector 16.

It is assumed that, as shown in FIG. 10*a*, 10*b*, the detector 16 is connected to the arbitrary line 38 and is initiated in operation. An impedance element 48 is provided which is equivalent to the change of impedance which the pushbutton telephone 13 is to detect. The resistor 26 is provided for adjusting the line current. The detector 16, the impedance element 48 and the resistor 26 are previously connected in the line, and the line current *i*, which flows when the button of the pushbutton telephone 13 is touched, is supplied via said impedance element and said resistor.

Under these conditions, a scanner 51 is provided in the system for scanning the current detecting steps shown in FIG. 9. The scanner 51 is started or initiated in operation by a contact 52*a* of a starting relay 52. When the relay 52 is energized, it closes its contacts 52*a*, 52*b*, 52*c* and 52*d*, thereby initiating operation of the detecting element 29 via said contacts 52*b* and 52*c* and connecting the impedance element 48 and the resistor 49 into the line.

When the detecting element 29 is operated, compensating current Is flows through the compensating winding 35 via a resistor R0 of Step 0. The resistor R0 is a resistor of the compensating resistor 39'. If there is an output of the sense winding 37 at such time, it indicates that the line resistance has a magnitude of less than R. In this case, the scanner 51 commences the scanning of the steps beginning with Step 1 without disconnecting the line current adjusting resistor 26 from the line. If the sense winding 37 provides an output in Step 0, this indicates that the magnitude of the line resistance is greater than R. In this case, the line current adjusting resistor 26 is short-circuited by the contact 25. Consequently, the line current increases and exceeds the detecting area of Step 0. Thus, the output of the sense winding 37 is no longer evident and the scanner 51 commences scanning in the aforedescribed manner, beginning with Step 1. Thus, even if the magnitude of the line resistance is between the magnitudes 0 and 2R, the total line resistance may always be limited between R and 2R by the line current adjusting circuit 25, 26.

FIG. 10*a*, 10*b* thus provides the following advantages. Since the oscillator 21 of the pushbutton telephone 13 comprises a non-linear element such as a semiconductor element, the DC resistance is varied by the magnitude of the line current and it is difficult to set a constant magnitude. This problem is solved, however, by the system of the invention. The same detecting step may be utilized repeatedly. Since only a small number of steps are required to set the detecting area, the setting of said detecting area may be performed in a brief period of time.

In order to detect the change in condition of the equipment, it is first necessary to recognize the changing area of the line current flowing between the equipment and the apparatus for detecting a change in condition in the equipment and thereby to set the current in the compensating winding so that said apparatus may perform the most suitable operation.

The aforementioned change of the line current is caused by the change of the impedance of the equipment, which is determined by whether or not the button at the side of said equipment is pressed. The setting of the current in the compensating winding must be performed without the operation of the equipment by the operator. For this reason, the present invention is provided with the impedance element.

Since the impedance element has the same value as the impedance of the equipment at the time that the button of the equipment is pressed, the value of the line current flowing through the line becomes the same as in the case of the pressing of the button of the equipment by connecting said impedance element with the line without practically pressing said button. By recognizing this value, it becomes possible to know the value of the line current at the time of the pressing of the button of the equipment. The setting of the current in the compensating winding most suitable for the line current can be effected by knowing the value of said line current.

In accordance with the embodiment of the present invention, the impedance element is connected with the line in order to permit the line current to flow through the line and the control winding and in this condition the compensating resistor is connected with the compensating winding successively changing in order so that the most suitable current in the compensating winding can be set.

As hereinbefore mentioned, the present invention provides the setting of the current in the compensating winding by the use of the impedance element.

When the adjustment of the line current is completed, the scanner 51 automatically detects the range of Step 1. When the pushbutton telephone 13 is connected with the multifrequency originating register 12' via the starting relay 52, the scanner 51, the detecting element 29 and the line current adjusting circuit 25, 26 are connected into the circuit and initiated in operation by the contacts 52*a*, 52*b*, 52*c* and 52*d* of said relay. At such time, a loop line current flows through the control winding 34 of the detecting element 29 via the impedance element 48, the adjusting resistor 26, the current supply relay 32, the line 38, the telephone transmitter 19 of the pushbutton telephone 13 and the varistor 22 of said telephone, and produces the magnetic field $\theta c$. At the same time, compensating current flows through the compensating winding 35, via the resistor R0 of Step 0 and produces the magnetic field $\theta s0$.

The magnetic field $\theta s0$ is set so that the sense winding 37 may produce an output if the magnitude of the line resistance is greater than R. Therefore, if the magnitude of the line resistance is less than R there is no output in the sense winding 37 and a relay 53 is energized via the contact 52*a* of the starting relay 52. The starting circuit of a line current adjusting relay 54 is thus opened. If the magnitude of the line resistance is greater than R, the operation of the relay 53 is restricted by the output of the sense winding 37 and the line current adjusting relay 54 is energized and is maintained in energized condition by a self-holding circuit via its contact 54*a*.

When the line current adjusting relay 54 is energized, it closes its contact 54*a* and its contact 25. When the contact 25 is closed, it short-circuits the adjusting resistor 26 which is connected in series in the line. Consequently, the line current increases and the balance between the magnetic fields $\theta c$ and $\theta s0$ is lost, and the output of the sense winding 37 is lost and the relay 53 is energized. In any case, when the adjustment of the line current is completed, the relay 53 is energized and the detecting area setting circuit is initiated in operation by its contact 53*c*, since the energization of said relay switches the contacts 53*a*, 53*b* and 53*c*. When the contact 53*c* is switched, a current corresponding to Step 1 flows through the compensating winding 35.

When the relay 53 is energized, it energizes a relay 55 via the contact 53*a* of the relay 53. When the relay 55 is energized, it switches its contacts 55*a*, 55*b*, 55*c* and 55*d*.

When the relay 53 is energized, but before the relay 55 is energized, current is provided which is equivalent to the current which will flow if the subscriber touches the button of his pushbutton telephone 13 and connects the resistor 24 of the oscillator 21 into the circuit. The current flows to the control winding 34 through the impedance element 48 and produces a magnetic field $\theta c$. At such time, compensating current flows in the compensating winding 35 via the resistor R1 of the compensating resistor 39' and produces a magnetic field $\theta s1$. Drive pulses are always supplied from the driver 41 to the drive winding 36, so that if the aforementioned magnetic fields $\theta c$ and $\theta s1$ are nearly equal, they negate each other and an output is provided at the sense winding 37.

The output of the sense winding 37 is converted into DC signals by the thyristor 44. The DC signals are supplied to a relay 56 and energize said relay, and disconnect the operating circuit of the relay 55 via the contact 56b of said relay. When the relay 56 is energized, it switches its contacts 56*a*, 56*b*, 56*c*, 56*d* and 56*e*. The DC signals from the thyristor 44 also short-circuit the impedance element 48 via the contact 56*a* and disconnect said impedance element from the line 38. At such time, therefore, the compensating current is set to a value determined by the resistor R1. The detecting area is set, for example, to Step 1 of FIG. 10*a*, 10*b*. If the magnetic field $\theta c$ is very much greater than the magnetic field $\theta s1$, the magnetic core 33 remains saturated and no output is provided in the sense winding 37. The relay 56 is then not energized.

When the relay 55 is energized, current flows through the compensating winding 35 via the resistor R2 of the compensating resistor 39' and the contact 55*b* of said relay. The magnetic field $\theta s$ thus increases. If the magnetic field $\theta c$ becomes nearly equal to the magnetic field $\theta s2$ at such instant, as in the aforedescribed case, the relay 56 is energized and disconnects the impedance element 48 from the line 38. When the relay 56 is energized, it maintains the relay 55 in energized condition and disconnects the relay 57 from the circuit via the contact 56*c*. Consequently, compensating current is set to a value determined by the resistor R2 and the detecting area is set to Step 2 of FIG. 10*a*, 10*b*.

If the magnetic field $\theta c$ is considerably different from the magnetic field $\theta s2$, the combination of resistors R1, R2, R3 and R4 of the compensating resistor 39' is varied by the relays 55 and 57 in a similar manner to change the compensating current flowing through the compensating winding 35 until the magnetic field $\theta c$ becomes nearly equal to the magnetic field $\theta s$. The detecting area is automatically set in the detector 16, as hereinbefore described. When the detecting area is set and the impedance element 48 is disconnected, however, a current equivalent to the current which will flow when the resistor 24 of the pushbutton telephone 13 is not connected into the circuit flows through the control winding 34. The magnetic core 33 is therefore saturated again and the previously set detecting area is departed from. The output of the sense winding 37 is then lost. Consequently, a relay 58 is energized, thereby switching its contacts 58*a* and 58*b*, and transmits a dial tone to the subscriber via its contacts 58*b* and connects the output of the detector 16 to the connector via its contact 58*a*. The dial tone is produced by a dial tone generator 59.

As hereinbefore described, in accordance with the invention, the impedance element 48 is previously connected into the line 38 and the detecting area is set via the talking circuit of the subscriber. After the setting of the detecting area, the impedance element 48 is disconnected from the line 38 and the detecting function of the detector 16 is automatically confirmed and tested. The dial tone is then transmitted. Therefore, the detector functions with extremely high stability and is not affected by line resistance. That is, the detecting area is set by the current itself flowing through the subscriber's pushbutton telephone 13 circuit and the line 38, and the operation of the button by the subscriber is detected or determined by the same detector after the setting. The spread of the line, telephone circuit and detecting element thus becomes negligible and transient characteristics of line current and variation of carbon resistance of the telephone transmitter 19 of the telephone circuit cannot be completely corrected. These must therefore be previously included in the impedance element 48.

In FIG. 10b, when the contact 56*a* is closed, both ends of the impedance element 48 are short-circuited by the contact 56*a*. In this condition, there is no current flowing through the impedance element 48. Accordingly, the impedance element 48 is electrically disconnected from the line.

FIG. 11*a*, 11*b* and FIGS. 12*a*, 12*b*, 12*c* and 12*d* show embodiments of a connector through which multifrequency receivers 11 are connected into the circuit by multifrequency originating registers 12′. In FIG. 11*a*, 11*b*, a plurality of selectors 61–1, 61–2, . . . 61–*m* are provided corresponding in number to the plurality of multifrequency receivers 11–1, 11–2, . . . 11–*m*. Each of the selectors 61–1 to 61–*m* has a set of start detecting relays 62–1*a*, 62–1*b*, . . . 62–1*n*, 62–2*a*, 62–2*b*, . . . 62–2*n*, 62–*ma*, 62–*mb*, . . . 62–*mn* and connector relays 63–1*a*, 63–1*b*, . . . 63–1*n*, 63–2*a*, 63–2*b*, . . . 63–2*n*, 63–*ma*, 63–*mb*, . . . 63–*mn* corresponding to the multifrequency originating registers 12′–1, 12′–2, . . . 12′–*n*. *In FIG. 11a*, 11*b*, each of the start detecting relays 62–1*a*, and so on, comprises a reed relay having a high resistance winding and rapid-acting under control by low electric power. Each of the connector relays 63–1*a*, and so on, comprises a wire spring relay having a low resistance winding and rapid-acting under control by high electric power.

If a terminal 64–1 of the multifrequency originating register 12′–1 is initiated in operation, one of the start detecting relays 62–1*a*, 62–2*a*, . . . 62–*ma* in a selector having the highest priority order of selectors, the corresponding multifrequency receiver of which is idle and in which the contacts of the connector relays 63–1*a*, 63–2*a*, . . . 63–*ma*, and so on, are closed, is energized. A start detecting relay may be energized by energization or excitation for an extremely short period of time, less than several milliseconds, and the connector relay corresponding to the energized start detecting relay is energized by the contact 62–1*aa*, and so on, of the corresponding start detecting relay.

If more than two multifrequency originating registers 12′–1 to 12′–*n* are started in operation simultaneously, there is competition among the corresponding connector relays and a connector relay corresponding to the multifrequency originating registers 12′–1 to 12′–*n* of the highest priority order is energized. The connector relay which wins the competition opens the energizing circuit of the other start detecting relays via its contact 63–1*aa*, and so on. When the energizing circuits are opened, the start detecting circuits are opened, the start detecting relays are immediately deenergized and they may be deenergized in a brief period of time, under a millisecond, since they are reed relays.

Only a single relay, which wins the competition of the *n* connector relays of a single line 1 to *m* is maintained in energized condition to connect a multifrequency originating register 12′–1 to 12′–*n* to a multifrequency receiver 11–1 to 11–*m*. At the same time, the contact of the connector relay which wins the competition designates the selector 61–1 to 61–*m* corresponding to the next idle multifrequency receiver 11–1 to 11–*m*. The multifrequency originating register 12′–1 to 12′–*n* which loses the competition successively connects into circuit the idle multifrequency receivers 11–1 to 11–*m* in the same manner.

The method of setting the priority selection among the selectors 61–1 to 61–*m* is as follows. In FIG. 11*a*, 11*b*, a plurality of memory relays 65–1, 65–2, . . . 65–*m* are provided, each of which corresponds to a specific one of the selectors 61–1 to 61–*m*. The memory relays 65–1 to 65–*m* are priority designation memory relays. If it is assumed that only the memory relay 65–1 is energized, the selector 61–1 is connected to the multifrequency receiver 11–1 by the contact 65–1*a* of said relay. The other selectors 61–2 to 61–*m* are not connected to the multifrequency receivers 11–2 to 11–*m*, because the contacts 65–2*a* to 65–ma of said relays are not closed. Under such conditions, the priority selection order is given only to the selector 61–1.

When the multifrequency receiver 11–1 is selected by the selector 61–1, one of the connector relays 63–1*a* to 63–1*n* is energized and the memory relay 65–2 of the selector 61–2 is energized by one of the contacts 63–2*ab* to 63–2*nb* of said one of the connector relays in the selector 61–2. The energizing circuit of the memory relay 65–1 is disconnected by the contacts 63–1*ab* to 63–1*nb* of the connector relays in the selector 61–1, thereby deenergizing said memory relay. The priority selection order is transmitted to the selector 61–2. The memory relay 65–2 maintains itself energized via its contact 65–2*a* until the selector 61–2 selects the multifrequency receiver 11–2. Therefore, the memory relay 65–2 is not deenergized, even if the selector 61–1 is deenergized and opens the contacts 63–2*ab* to 63–2*nb* of the selector 61–2.

Thereafter, the priority designation memory relays of the other selectors are successively operated in the aforedescribed manner and the priority selection order is accordingly varied.

Figure 12A:
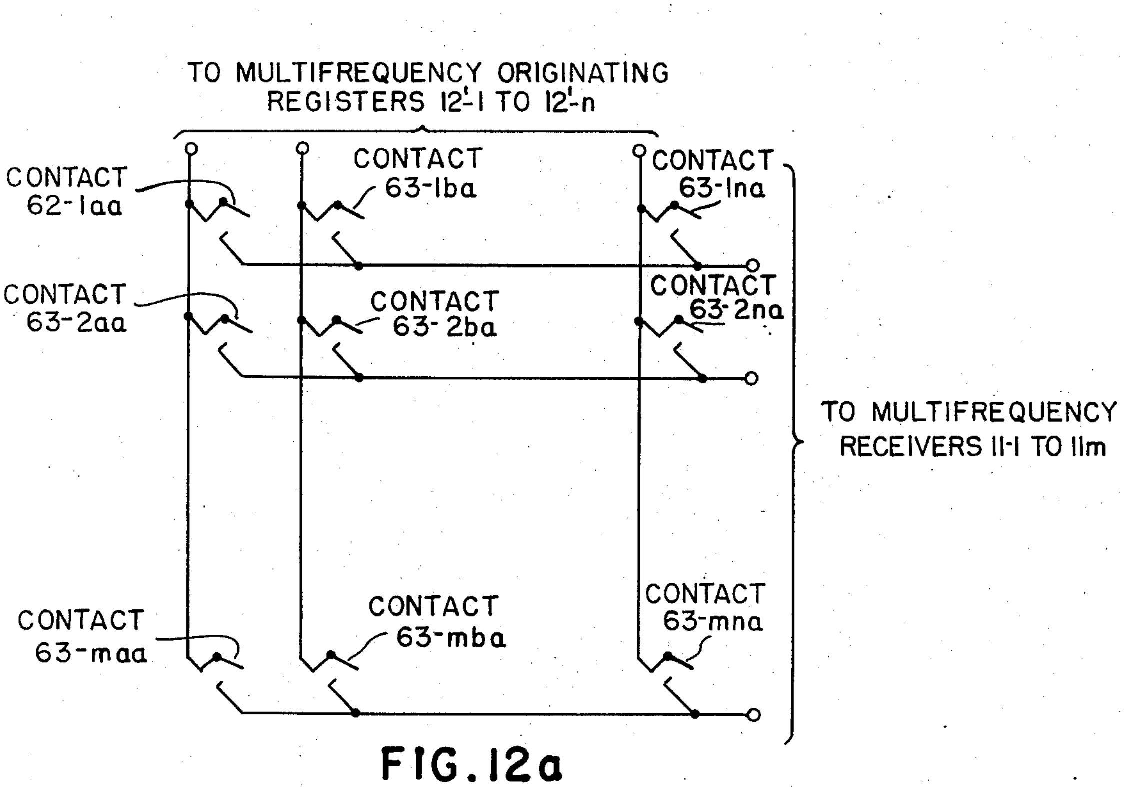
Figure 12B:
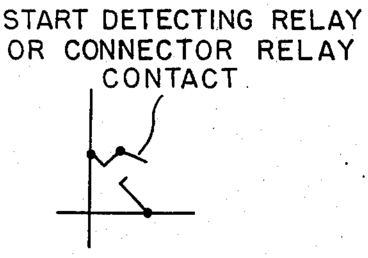
Figure 12C:
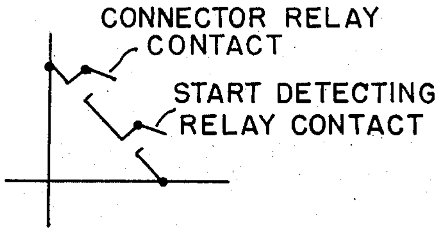
Figure 12D:
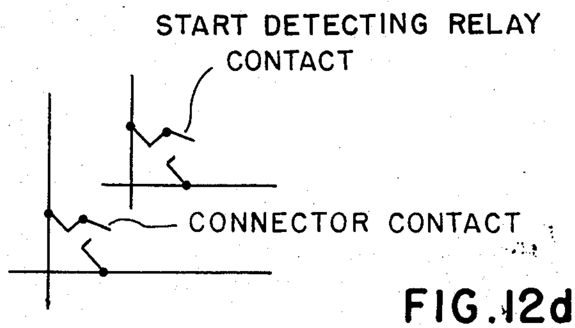

FIG. 12*a* illustrates a method of multiple connection of connector leads between m multifrequency originating registers 12′–1 to 12′–*n* and m multifrequency receivers 11–1 to 11–*m*. Each of FIGS. 12*b*, 12*c* and 12*d* shows one of the connector contacts at the points of intersection of FIG. 12*a*. In FIG. 12*b*, a connector contact is constituted by the contact of a start detecting relay or by the contact of a connector relay.

In FIG. 12*c*, a connector contact, which is the same as that of FIG. 12*b*, is constituted by the contact of a connector relay and the contact of a start detecting relay connected in series with each other, thereby providing an AND condition. In FIG. 12*d*, a combination of more than two leads is provided, one of the leads comprising the contact of a start detecting relay and the other of the leads comprising the contact of a connector relay. The arrangements of FIGS. 12*c* and 12*d*, in which the connection completion is confirmed by an AND condition of the contacts, have the advantage that when a plurality of terminals 64–1 to 64–*n* (FIG. 11*a*, 11*b*) are energized completely simultaneously, a plurality of multifrequency originating registers 12′–1 and 12′–*n* scramble for a single idle multifrequency receiver 11–1 to 11–*m*.

When a plurality of terminals 64–1 to 64–*n* are energized completely simultaneously, a plurality of connector relays in a single line are sometimes operated simultaneously. At such time, a plurality of multifrequency originating registers 12′–1 to 12′–*n* are connected in parallel to a single multifrequency receiver 11–1 to 11–m via the connector. Consequently, a mixture of information occurs between an information to be transferred from a multifrequency originating register 12′–1 to 12′–*n* and an information to be transferred from another of said multifrequency originating registers. There is thus no possibility that an erroneous information may be transferred to the multifrequency receivers 11–1 to 11–m.

The arrangement of either of FIGS. 12*c* or 12*d* prevents the transfer of erroneous information to the multifrquency receivers 11–1 to 11–*n*. Thus, even if a plurality of connector relays in a line are completely simultaneously energized and their contents are closed, other energizing circuits than a single start detecting relay corresponding to the connecting relays are disconnected from the circuit by the plurality of connector relay contacts. The circuit path of the mixed information is therefore removed during a short period of time in which the start detecting relays of a line are deenergized. Therefore, in a transfer system, the information may be transferred after a specified time has passed since the closing of the connector relay contacts. Alternately, the general wire spring relays, which are not energized, may not be energized longer than the period of time required for the release of the start detecting relays of a line. In the latter case, the wire spring relays are utilized as information transferring and receiving relays in the multifrequency originating registers 12′–1 to 12′–*n* or the multifrequency receivers 11–1 to 11–*m*. This eliminates the problem of erroneous transfer of information due to double connection of connectors and the connectors may be more rapidly closed or connected in circuit than the connectors of a conventional system.

It is well known that the aforedescribed system utilizing DC signals is an essentially ideal system, since it is far from erroneous operation due to voices. Furthermore, a multifrequency or pushbutton service may be provided by combining the system with the subscriber's erroneous operation preventing circuit of the invention. FIG. 14 illustrates that the storage of an erroneous signal in a conventional system may be completely eliminated by the use of the DC key signal.

FIG. 14 shows that, in accordance with the conventional method, a dial number 1 2 3 4 5 6 which the subscriber intends to dial may be converted into a completely different number such as, for example, 1 5 5 6 0 and may be erroneously stored. This is due to the fact that the period of time during which the subscriber touches the button of his pushbutton telephone is too short, or the subscriber erroneously touches an adjacent pushbutton of his telephone. This results in the signals not being received or a division of signals occurring.

If the DC key signal detection and the AC signal reception confirmation are combined, when AC signals cannot be received due to the erroneous operation by the subscriber, even after the subscriber touches the pushbutton of his telephone, a relay 66, as shown in FIG. 13, is energized. When the relay 66 is energized, a busy tone connection is made. Then, even if the AC signals are divided after the reception of the normal information, the division becomes negligible, since the DC key signals continue.

FIG. 13 is a circuit diagram of the erroneous operation preventing circuit of the invention utilizing key signals. In FIG. 13, when a subscriber touches the pushbutton of his telephone, the touching of the pushbutton is detected or determined by the detecting element 29. The thyristor 44 is switched to its conductive condition and initiates the operation of the connector and energizes a relay 67. The relay 67 is maintained in energized condition by its contact 67*a*. If the subscriber touches the pushbutton of his telephone in a normal manner, the connector is closed, and the multifrequency receiver 11 receives multifrequency signals of one digit from the subscriber.

When the received information is converted and transferred to the multifrequency originating register 12′ from the multifrequency receiver 11, two of a plurality of relays 68, comprising relays 68–0 to 68–7, are energized. Consequently, a multifrequency signal discriminating relay 69 is energized and indicates that the multifrequency signals were correctly detected or determined. When the relay 69 is energized, the relay 67 is deenergized. An auxiliary relay 72 is energized.

When the relay 69 is energized, it switches its contacts 69*a*, 69*b*, 69*c* and 69*d*, and the received signals are stored in a conventional manner, not shown in FIG. 13. Furthermore, when the relay 71 is energized, the connection is advanced by one step and, simultaneously, a line to the multifrequency receiver 11 is disconnected by contacts 71*c* and 71*d* of said relay. Consequently, the transmission of multifrequency signals to the multifrequency receiver 11 is terminated, and the relays 68–0 to 68–7 are deenergized. When the relays 68–0 to 68–7 are deenergized, the relay 69 is deenergized via the relay 68 contacts.

In the aforedescribed circumstances, the number information transmitted by the touching of the pushbutton by the subscriber is stored in the multifrequency originating register 12′ and the transfer of number information from the multifrequency receiver 11 to said multifrequency originating register is completed. The number information is erased by the cessation of the arriving multifrequency signals. The multifrequency receiver 11 may therefore be disconnected as an idle receiver, and it is unnecessary to display the fact that said receiver is idle.

When the relay 69 is deenergized, the output of the connector starting terminal 64 is disconnected via the contact 69*c*, and the connector is released. The multifrequency receiver 11 in the idle condition is utilized for the next connection to the multifrequency originating register 12'. Even after the connector is disconnected, the output of the sense winding 37 of the detecting element 29, which is provided by the continued touching of the pushbutton of his telephone by the subscriber, is switched by the contact 69*c*, so that the relay 71 may be maintained in energized condition. The connecting circuit is therefore maintained in condition.

When the subscriber releases the pushbutton of his telephone, the output of the sense winding 37 of the detecting element 29 is terminated and the relay 71 is deenergized. Preparation is then made for the reception of the next digit. Since the dial tone generator 59 is disconnected from the circuit via the contact 67b of the relay 67, the reception of erroneous signals at the third higher harmonic of the dial tone is also complely prevented.

In the aforedescribed arrangement, the signals were transmitted normally. If, however, only brief or short AC signals are transmitted, because the pushbutton is touched for a brief or short period of time, or because of a division of signals, the connecting relays, not shown in the FIGS., cannot be energized, so that the relay 69 is not energized. If the subscriber releases the pushbutton of his telephone under these conditions, the output of the sense winding 37 is terminated and the thyristor 44 is switched to its non-conductive condition. The relay 67 is energized and, via its contacts 67*a*, energizes the relay 66, by connecting it to ground. The relay 67 disconnects the thyristor 44 from the remainder of the circuit by switching its contact 67*c*.

When the relay 66 is energized, a busy tone is immediately transmitted to the subscriber in a well known manner, not indicated in FIG. 13, and the multifrequency originating register 12' is released or disconnected. When signals are determined or detected, the relay 69 is energized, the relay 67 is deenergized and the relay 71 is energized. The energizing circuit of the relay 69 is cut off by the contact 71*a* of the relay 71. The relay 71 is maintained in its energized condition via its contact 71*b*. Therefore, if the preceding signals are terminated due to the division of signals, and the relay 69 is deenergized, said relay cannot be energized again, and the succeeding signals are not received or stored, even if the relays 68–0 to 68–7 are energized again by the succeeding signals.

FIG. 15*a*, 15*b* illustrates the system of the invention of utilizing multifrequency receivers 11–1 to 11–*m*, as hereinbefore described. In the system for utilizing multifrequency receivers in common, in accordance with the invention, the resistance of the subscriber line 38 is adjusted. A detecting area corresponding to the distance of the line is automatically set by the use of the impedance element 48. Thereafter, the impedance element 48 is short-circuited via the contact 56*a* to confirm that the detecting area is departed from. A dial tone indicating the completion of preparation for transmission is then transmitted to the subscriber.

The adjustment of the line resistance and the setting of the detecting area are undertaken by the utilization of a single current detector or detector 16 via the subscriber's telephone. This provides extremely high safety. A three value detecting element 29 utilizes the magnetization characteristic of the magnetic core 33 of the detector 16, so that erroneous operation due to cradling, or the like, may also be prevented. Since the inductance is low, the increase of the line current is rapid, and operation at high speed, high sensitivity and far from voltage variation may be realized.

The receiver is utilized only when the subscriber touches the pushbutton of his telephone. Furthermore, after the received information is transferred to the multifrequency originating register 12', the receiver is disconnected, even if the subscriber keeps touching the pushbutton of his telephone. The holding time of the multifrequency receiver 11 may then be made very brief or short. Erroneous operation of the pushbutton by the subscriber may be detected or determined by the multifrequency originating register 12', so that subscriber service and system operation may also be improved. The idle condition of the multifrequency receiver 11 is determined by the connector and the relays and confirmed by the multifrequency originating register. The idle condition of the receiver itself is therefore not required to be displayed and the holding time may be made very brief.

In FIG. 15*a*, 15*b*, when multifrequency signals are transmitted from the telephone, the connector is connected or started in operation by the multifrequency originating register 12', in the aforedescribed manner. When the connector is connected or initiated in operation, the relay 63–1*a* is energized, the multifrequency originating register 12'–1 is connected to the multifrequency receiver 11–1 via the contact 63–1*ab* of said relay, and talking lines between the telephone 13 and the multifrequency originating register 12'–1 are extended to the multifrequency receiver 11–1 and function as multifrequency signal transfer lines.

Multifrequency signals are then transmitted from the subscriber and received by the multifrequency receiver 11–1 via the multifrequency signal transfer line. When multifrequency signals of one digit are received by the multifrequency receiver 11–1, said signals are converted into DC signals and are transferred to the information receiving relays 68–0, 68–1, 68–2, 68–4 and 68–7 of the multifrequency originating register 12'–1 via the connector. DC signals transferred from the multifrequency receiver 11–1 are coded in a code comprising "two out of five". Therefore, two relays of the information receiving relays 68–0, 68–1, 68–2, 68–4 and 68–7 are energized.

When it is confirmed that the two information receiving relays have been energized in the multifrequency originating resistor 12'–1, the relay 69 is energized and stores DC signal information of the multifrequency receiver 11–1 in a storage circuit, not shown in FIG. 15*a*, 15*b*. When the relay 69 is energized, the relay 71 is energized via the contact 69*a* of the relay 69. When the relay 71 is energized, it advances a connecting circuit, not shown in FIG. 15*a*, 15*b*, and also disconnects the multifrequency signal transfer line. That is, in the invention, in order to save the contact of the relay 71 and to prevent the generation of noises in the disconnection of the talking lines or multifrequency signal transfer lines, the relay 71 is energized to connect said talking lines to ground. When the relay 71 is energized, it switches diodes 72 and 73 to their conductive condition and connects them to ground via a low resistance, and switches diodes 74 and 75 to their non-conductive condition and disconnects the multifrequency signal transfer lines.

When the transfer of multifrequency signals to the multifrequency receiver 11–1 terminates, and the termination is confirmed by said receiver, the information receiving relays 68–0, 68–1, 68–2, 68–4 and 68–7 of the multifrequency originating register 12'–1 are deenergized. The relay 69 is thus deenergized. Under these conditions, the number informations transmitted by the subscriber's touching the pushbutton of his telephone 13 are stored in the multifrequency originating register 12'–1. Since the transfer of the number informations by the multifrequency receiver 11–1 to the multifrequency originating register 12'–1 is completed, said number informations are erased by the termination of the transfer of the multifrequency signals and said multifrequency receiver may be made idle and may be disconnected from the circuit. It is therefore unnecessary to indicate or display the fact that the multifrequency receiver 11–1 is idle.

When the relay 69 is deenergized, the output of the connector starting lead is discontinued. The connector is released or disconnected, and the idle multifrequency receiver 11–1 is utilized for the next connection from the multifrequency originating register 12'–1. The output of the sense winding 37 of the detecting element 29 is provided by the continued touching of his pushbutton by the subscriber after the connector is disconnected. The output of the sense winding 37 is switched via the contact 69c of the relay 69 to maintain the relay 71 in its energized condition. The connecting circuit is therefore not advanced.

When the subscriber releases his telephone pushbutton, the output of the sense winding 37 is terminated and the relay 71 is deenergized. Preparation for receiving the next digit is then made. If the subscriber releases his telephone pushbutton before the multifrequency receiver 11 is connected, due to the delay in operation of the connector, the output of the sense winding 37 terminates before the relays 69 and 71 are energized. Consequently, the multifrequency originating register 12' is released or disconnected and a busy tone is transmitted from a well known subscriber circuit, not shown in the FIG.

While the invention has been described by means of specific examples and in specific embodiments, we do not wish to be limited thereto, for obvious modifications will occur to those skilled in the art without departing from the spirit and scope of the invention.

We claim:

1. Apparatus for detecting a change in condition in equipment, said apparatus comprising a magnetic core;

a control winding wound on said core and connected in a line of a circuit having a current which varies in accordance with a change of condition of the equipmemt for detecting the line current and producing a magnetic field in accordance with said line current;

a compensating winding wound on said core for producing a magnetic field opposite to the magnetic field produced by said control winding;

a drive winding wound on said core;

drive means connected to said drive winding for supplying drive current to said drive winding to produce a magnetic field in said drive winding;

a sense winding wound on said core for sensing the magnetic condition of said core;

an impedance element having an impedance equivalent to the minimum value of impedance difference caused by the operation of the equipment, the impedance of said impedance element limiting said line current;

connecting means connecting said impedance element in the line of the circuit, and disconnecting said impedance element from the line of the circuit;

compensating resistors; and scanner means connecting said compensating winding to some of the compensating resistors in steps for determining the magnitude of current through said compensating winding.

2. Apparatus as claimed in claim 1, further comprising a line adjusting resistor, and wherein said connecting means connects said line adjusting resistor in series with said control winding.

3. Apparatus as claimed in claim 1, further comprising a thyristor having anode, cathode and gate electrodes, and a release pulse generator coupled to said thyristor, and wherein said sense winding is connected between the cathode and gate electrode of said thyristor in a manner whereby an output signal in said sense winding switches said thyristor to its conductive condition, said release pulse generator supplying release pulses of brief duration to said thyristor to switch said thyristor to its non-conductive condition.

4. A system for detecting a change in condition in any of a plurality of equipments, each of said equipments transmitting multifrequency signals, said system comprising a plurality of multifrequency receivers for receiving the multifrequency signals transmitted from said equipments and converting said signals into DC signals;

a plurality of multifrequency originating registers;

apparatus for detecting a change in condition in any of said equipments by detecting a slight change in magnitude in DC in a line of a circuit having a current which varies in accordance with a change of condition of the equipment each time multifrequency signals are transmitted by the equipment, said apparatus comprising a magnetic core, a control winding wound on said core and connected in the line of the circuit for detecting the line current and producing a magnetic field in accordance with said line current, a compensating winding wound on said core for producing a magnetic field opposite to the magnetic field produced by said control winding, a drive winding wound on on said core, drive means connected to said drive winding for supplying drive current to said drive winding to produce a magnetic field in said drive winding, a sense winding wound on said core for sensing the magnetic condition of said core, an impedance element having an impedance equivalent to the minimum value of impedance difference caused by the operation of the equipment, the impedance of said impedance element limiting said line current, connecting means for connecting said impedance element in the line of the circuit and for disconnecting said impedance element from the line of the circuit, compensating resistors, and scanner means connecting said compensating winding to some of the compensating resistors in steps for determining the magnitude of current through said compensating winding; and a connector for connecting each of said receivers to a corresponding one of said registers, said connector providing a multifrequency signal transfer line between an equipment and a selected multifrequency receiver when there is a change in magnitude in said DC, said selected receiver converting said signals into DC signals, and a register removing said multifrequency signal transfer line when the DC signals are transferred from said receiver to said register.

5. A system as claimed in claim 4, further comprising separate control means for separately controlling said connector and the multifrequency signal transfer line.

6. A system as claimed in claim 4, wherein said multifrequency signal transfer line includes switching means having a rectifier, and said register controls said multifrequency signal transfer line by applying an electrical potential to said multifrequency signal transfer line via said rectifier.

7. A system as claimed in claim 4, wherein said register includes a first relay energized by the output signal of said sense winding and deenergized by the detection of multifrequency signals, and a second relay energized by the suppression of the output signal of said sense winding for more than a specified period of time during the energization of said first relay.

8. A system as claimed in claim 4, wherein said register includes a first relay energized by the output signal of said sense winding and deenergized by the detection of multifrequency signals, a second relay energized by the suppression of the output signal of said sense winding for more than a specified period of time during the energization of said first relay, a third relay for detecting the multifrequency signals, and a fourth relay energized by the energization of said third relay and maintained energized during the provision of an output signal by said sense winding, said third relay being deenergized by energization of said fourth relay.

9. A system as claimed in claim 4, wherein said connector comprises a plurality of selectors each corresponding to a corresponding one of said multifrequency receivers, each of said selectors having a priority designation memory relay energized by the output of the next-preceding selector and deenergized by operation of another of said selectors, and further comprising means for supplying a priority selection signal to a selector whose priority designation memory relay is energized.

10. A system as claimed in claim 4, wherein said connector comprises a plurality of selectors each corresponding to a corresponding one of said multifrequency receivers, each of said selectors having a plurality of sets of start detecting relays and connector relays, each set corresponding to a corresponding one of said multifrequency originating registers in a manner whereby when a selector is operated simultaneously by a plurality of multifrequency originating registers start detecting relays of the operated selector corresponding to operating multifrequency originating registers are energized thereby energizing corresponding connector relays, the earliest energized connector relay deenergizing other start detecting relays than that corresponding to the earliest energized connector relay, the energization of the start detecting relay and the connector relay of a set causing a multifrequency receiver to be connected to a multifrequency originating register.

11. Apparatus for detecting a change in condition in equipment, said apparatus comprising a magnetic core;

a control winding wound on said core and connected in a line of a circuit having a current which varies in accordance with a change of condition of the equipment for detecting the line current and producing a magnetic field in acordance with said line current;

a compensating winding wound on said core for producing a magnetic field opposite to the magnetic field produced by said control winding;

a drive winding wound on said core;

drive means connected to said drive winding for supplying drive current to said drive winding to produce a magnetic field in said drive winding;

a sense winding wound on said core for sensing the magnetic condition of said core;

an impedance element having an impedance equivalent to a variation of impedance of the equipment, the impedance of said impedance element limiting said line current; and connecting means connecting said apparatus to said equipment and connecting said impedance element in the line of the circuit to limit the magnitude of the current flowing through said compensating winding, and disconnecting said impedance element from the line of the circuit to detect the change in condition of said equipment.

* * * * *